(12) United States Patent
Keshavarz et al.

(10) Patent No.: US 8,877,365 B2
(45) Date of Patent: Nov. 4, 2014

(54) REDOX FLOW CELL REBALANCING

(75) Inventors: Majid Keshavarz, Pleasanton, CA (US); Chockkalingam Karuppaiah, Fremont, CA (US); Ge Zu, San Jose, CA (US); Saroj Kumar Sahu, Mountain House, CA (US); Suresh Kumar Surapalan Nair, Fremont, CA (US); Vasanthan Mani, Fremont, CA (US); Gopalakrishnan R. Parakulam, Cupertino, CA (US); Ali Firouzi, Los Altos, CA (US); Veluchamy Rasu, Fremont, CA (US)

(73) Assignee: Deeya Energy, Inc., Fremont, CA (US)

( * ) Notice: Subject to any disclaimer, the term of this patent is extended or adjusted under 35 U.S.C. 154(b) by 0 days.

(21) Appl. No.: 12/790,573

(22) Filed: May 28, 2010

(65) Prior Publication Data

US 2011/0086247 A1    Apr. 14, 2011

Related U.S. Application Data

(60) Provisional application No. 61/182,099, filed on May 28, 2009, provisional application No. 61/182,076, filed on May 28, 2009.

(51) Int. Cl.
*H01M 4/36* (2006.01)
(52) U.S. Cl.
USPC ........................................................ 429/105
(58) Field of Classification Search
USPC ................................................ 429/95, 51, 105
See application file for complete search history.

(56) References Cited

U.S. PATENT DOCUMENTS 3,060,737 A    10/1962    Arragon
3,201,337 A     8/1965    Eichelberger et al.
3,540,934 A    11/1970    Boeke
(Continued)

FOREIGN PATENT DOCUMENTS

DE    102006007206    10/2006
EP         0342901    11/1989
(Continued)

OTHER PUBLICATIONS

Office Action for U.S. Appl. No. 12/217,059 mailed Aug. 23, 2010.
(Continued)

*Primary Examiner* — Patrick Ryan
*Assistant Examiner* — Lucas J O'Donnell
(74) *Attorney, Agent, or Firm* — Haynes and Boone, LLP

(57) ABSTRACT

A redox cell rebalance system is provided. In some embodiments, the rebalance system includes electrochemical cell and a photochemical cell. In some embodiments, the photochemical cell contains a source of ultraviolet radiation for producing HCl from $H_2$ and $Cl_2$ generated by the system. The HCl product may be collected or circulated back through the system for the rebalancing of electrolytes. A rebalance cell for use in a rebalance system is also provided. In some embodiments, the rebalance cell is the combination of an electrochemical cell and a photochemical cell. In some embodiments, a source of ultraviolet radiation is housed in the cathode compartment of the rebalance cell. In some embodiments, the source of ultraviolet radiation is used to effect the formation of HCl from $H_2$ and $Cl_2$ present in the rebalance cell. The HCl is dissolved in aqueous electrolytes contained in the rebalance cell, which can subsequently be circulated through a rebalance system for the rebalancing of redox cells.

66 Claims, 13 Drawing Sheets

(56) References Cited

U.S. PATENT DOCUMENTS

| | | | |
|---|---|---|---|
| 3,685,346 | A | 8/1972 | Molloy |
| 3,996,064 | A * | 12/1976 | Thaller .................. 320/128 |
| 4,062,236 | A | 12/1977 | Clingman, Jr. |
| 4,133,941 | A | 1/1979 | Sheibley |
| 4,159,366 | A | 6/1979 | Thaller |
| 4,226,112 | A | 10/1980 | Jibelian |
| 4,309,372 | A | 1/1982 | Sheibley |
| 4,312,735 | A | 1/1982 | Grimes et al. |
| 4,328,780 | A | 5/1982 | Andrew |
| 4,370,392 | A | 1/1983 | Savinell et al. |
| 4,381,978 | A * | 5/1983 | Gratzel et al. .................. 205/340 |
| 4,414,090 | A | 11/1983 | D'Agostino et al. |
| 4,423,121 | A * | 12/1983 | Hammond et al. .................. 429/57 |
| 4,454,649 | A | 6/1984 | Jalan et al. |
| 4,468,441 | A | 8/1984 | D'Agostino et al. |
| 4,470,298 | A | 9/1984 | Jibelian |
| 4,485,154 | A | 11/1984 | Remick et al. |
| 4,496,637 | A | 1/1985 | Shimada et al. |
| 4,517,261 | A * | 5/1985 | Whittlesey .................. 429/64 |
| 4,543,302 | A | 9/1985 | Gahn et al. |
| 4,576,878 | A * | 3/1986 | Gahn .................. 429/51 |
| 4,584,867 | A | 4/1986 | Forster |
| 4,732,827 | A | 3/1988 | Kaneko et al. |
| 4,784,924 | A | 11/1988 | Savinell et al. |
| 4,804,632 | A | 2/1989 | Schuck et al. |
| 4,814,241 | A | 3/1989 | Nagashima et al. |
| 4,828,666 | A | 5/1989 | Iizuka et al. |
| 4,874,483 | A | 10/1989 | Wakabayashi et al. |
| 4,875,990 | A | 10/1989 | Kodachi et al. |
| 4,882,241 | A | 11/1989 | Heinzel |
| 4,885,938 | A | 12/1989 | Higashi |
| 4,891,629 | A | 1/1990 | Gajjar et al. |
| 4,894,294 | A | 1/1990 | Ashizawa et al. |
| 4,902,138 | A | 2/1990 | Goeldner et al. |
| 4,929,325 | A | 5/1990 | Bowen et al. |
| 4,945,019 | A | 7/1990 | Bowen et al. |
| 4,948,681 | A | 8/1990 | Zagrodnik et al. |
| 4,956,244 | A | 9/1990 | Shimizu et al. |
| 5,061,578 | A | 10/1991 | Kozuma et al. |
| 5,081,869 | A | 1/1992 | Hachey et al. |
| 5,162,168 | A | 11/1992 | Downing et al. |
| 5,188,911 | A | 2/1993 | Downing et al. |
| 5,236,562 | A | 8/1993 | Okumura et al. |
| 5,258,241 | A | 11/1993 | Ledjeff et al. |
| 5,311,447 | A | 5/1994 | Bonne |
| 5,339,687 | A | 8/1994 | Gimson et al. |
| 5,366,824 | A | 11/1994 | Nozaki et al. |
| 5,515,714 | A | 5/1996 | Sultan et al. |
| 5,542,284 | A | 8/1996 | Layzell et al. |
| 5,648,184 | A | 7/1997 | Inoue et al. |
| 5,648,601 | A | 7/1997 | Katoh et al. |
| 5,656,390 | A | 8/1997 | Kageyama et al. |
| 5,665,212 | A | 9/1997 | Zhong et al. |
| 5,759,711 | A | 6/1998 | Miyabayashi et al. |
| 5,780,737 | A | 7/1998 | Wible et al. |
| 5,851,694 | A | 12/1998 | Miyabayashi et al. |
| 5,913,250 | A | 6/1999 | Wible |
| 5,975,126 | A | 11/1999 | Bump et al. |
| 6,005,183 | A | 12/1999 | Akai et al. |
| 6,040,075 | A | 3/2000 | Adcock et al. |
| 6,086,643 | A | 7/2000 | Clark et al. |
| 6,272,919 | B1 | 8/2001 | Huiberts |
| 6,290,388 | B1 | 9/2001 | Saul et al. |
| 6,346,420 | B1 | 2/2002 | Miric et al. |
| 6,461,772 | B1 | 10/2002 | Miyake et al. |
| 6,475,661 | B1 * | 11/2002 | Pellegri et al. .................. 429/105 |
| 6,509,119 | B1 | 1/2003 | Kobayashi et al. |
| 6,524,452 | B1 | 2/2003 | Clark et al. |
| 6,536,273 | B2 | 3/2003 | Schrittenlacher |
| 6,555,267 | B1 | 4/2003 | Broman et al. |
| 6,562,514 | B1 | 5/2003 | Kazacos et al. |
| 6,629,455 | B2 | 10/2003 | Schrittenlacher et al. |
| 6,688,159 | B1 | 2/2004 | Grunewald |
| 6,692,862 | B1 | 2/2004 | Zocchi |
| 6,720,107 | B1 | 4/2004 | Holtom et al. |
| 6,759,158 | B2 | 7/2004 | Tomazic |
| 6,761,945 | B1 | 7/2004 | Adachi et al. |
| 6,764,789 | B1 | 7/2004 | Sekiguchi et al. |
| 6,820,480 | B2 | 11/2004 | De'Stefani et al. |
| 6,905,797 | B2 | 6/2005 | Broman et al. |
| 6,986,966 | B2 | 1/2006 | Clarke et al. |
| 7,046,531 | B2 | 5/2006 | Zocchi et al. |
| 7,061,205 | B2 | 6/2006 | Shigematsu et al. |
| 7,078,123 | B2 | 7/2006 | Kazacos et al. |
| 7,131,312 | B2 | 11/2006 | Yoshino et al. |
| 7,165,441 | B2 | 1/2007 | Bauer et al. |
| 7,181,183 | B1 | 2/2007 | Hennessy et al. |
| 7,184,903 | B1 | 2/2007 | Williams et al. |
| 7,191,645 | B2 | 3/2007 | Wible |
| 7,199,550 | B2 | 4/2007 | Tsutsui et al. |
| 7,220,515 | B2 | 5/2007 | Ito et al. |
| 7,227,275 | B2 | 6/2007 | Hennessy et al. |
| 7,329,389 | B2 | 2/2008 | Horovitz et al. |
| 7,554,220 | B2 | 6/2009 | Sugawara |
| 8,587,255 | B2 | 11/2013 | Parakulam et al. |
| 2002/0134135 | A1 | 9/2002 | Komehana et al. |
| 2003/0008203 | A1 | 1/2003 | Winter |
| 2004/0070370 | A1 | 4/2004 | Emura |
| 2004/0170893 | A1 | 9/2004 | Nakaishi et al. |
| 2004/0202915 | A1 | 10/2004 | Nakaishi et al. |
| 2004/0234843 | A1 | 11/2004 | Skyllas-Kazacos |
| 2004/0241544 | A1 | 12/2004 | Nakaishi et al. |
| 2005/0034997 | A1 | 2/2005 | Dimasclo et al. |
| 2005/0074653 | A1 | 4/2005 | Broman et al. |
| 2005/0156431 | A1 | 7/2005 | Hennessy |
| 2005/0156432 | A1 | 7/2005 | Hennessy |
| 2005/0158615 | A1 | 7/2005 | Samuel et al. |
| 2005/0164075 | A1 | 7/2005 | Kumamoto et al. |
| 2005/0181273 | A1 | 8/2005 | Deguchi et al. |
| 2005/0260473 | A1 | 11/2005 | Wang |
| 2006/0014054 | A1 | 1/2006 | Sugawara |
| 2006/0092588 | A1 | 5/2006 | Realmuto et al. |
| 2007/0072067 | A1 | 3/2007 | Symons et al. |
| 2007/0080666 | A1 | 4/2007 | Ritter et al. |
| 2007/0111089 | A1 | 5/2007 | Swan |
| 2008/0029404 | A1 | 2/2008 | Weber et al. |
| 2008/0081247 | A1 | 4/2008 | Nakaishi et al. |
| 2008/0101434 | A1 | 5/2008 | Horovitz et al. |
| 2008/0193828 | A1 | 8/2008 | Sahu |
| 2009/0218984 | A1 | 9/2009 | Parakulam |
| 2010/0003586 | A1 | 1/2010 | Sahu |
| 2010/0090651 | A1 | 4/2010 | Sahu |
| 2010/0092757 | A1 | 4/2010 | Nair |
| 2010/0092807 | A1 | 4/2010 | Sahu |
| 2010/0092813 | A1 | 4/2010 | Sahu |
| 2010/0092843 | A1 | 4/2010 | Conway |
| 2010/0094468 | A1 | 4/2010 | Sahu |
| 2010/0116024 | A1 | 5/2010 | De Coulon et al. |
| 2010/0136455 | A1 | 6/2010 | Winter |
| 2010/0143781 | A1 | 6/2010 | Keshavarz |
| 2011/0079074 | A1 | 4/2011 | Sahu |
| 2011/0081561 | A1 | 4/2011 | Keshavarz et al. |

FOREIGN PATENT DOCUMENTS

| | | |
|---|---|---|
| JP | 60047373 | 3/1985 |
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |

(56) References Cited

FOREIGN PATENT DOCUMENTS

| | | |
|---|---|---|
| JP | 2005142056 | 6/2005 |
| JP | 2005228622 | 8/2005 |
| JP | 2005228633 | 8/2005 |
| JP | 2005322447 | 11/2005 |
| JP | 2006107988 | 4/2006 |
| JP | 2006114360 | 4/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 | 6/1989 |
| WO | 9003666 | 4/1990 |
| WO | 0017991 | 3/2000 |
| WO | 03005476 | 1/2003 |
| WO | 2004079849 | 9/2004 |
| WO | 2006135958 | 12/2006 |

OTHER PUBLICATIONS

Search Report for PCT Application No. PCT/US2009/049285.
Office Action for U.S. Appl. No. 12/577,137 mailed Sep. 7, 2010.
ISR and Written Opinion for related PCT Application No. PCT/US2010/036764, dated Feb. 7, 2011.
Moraw, Franz Christian, "Hybrid PEM Fuel Cell: Redox Cathode Approach," *A Thesis for the Degree of Master of Applied Science in the University of BC*, 2009, 159 pages.
International Search Report for related PCT Application No. PCT/US2010/036772, date of mailing Dec. 27, 2010.
First Office Action mailed Apr. 15, 2013 in related Chinese Appl. No. 201080033323.0.
First Office Action mailed Oct. 22, 2013, in related Chinese Application No. 201080033238.4.

* cited by examiner

REDOX FLOW CELL REBALANCING

PRIORITY CLAIM

This application claims the benefit of U.S. Provisional Application No. 61/182,099 entitled "Flow Cell Rebalancing" filed on May 28, 2009; and to U.S. Provisional Patent Application No. 61/182,076 entitled "Hydrogen Chloride Level Detector", filed May 28, 2009.

BACKGROUND OF THE INVENTION

1. Field of the Invention

The present disclosure relates to reduction-oxidation (redox) flow cells and, in particular, to rebalance systems that may be utilized in redox flow cells.

2. Description of the Relevant Art

There is an increasing demand for novel and innovative electric power storage systems. Redox batteries have become an attractive means for such energy storage. In certain applications, a redox flow battery may include one or more redox flow cells. Each of the redox flow cells may include positive and negative electrodes disposed in separate half-cell compartments. The two half-cells may be separated by a porous or ion-selective membrane, through which ions are transferred during a redox reaction. Electrolytes (anolyte and catholyte) are flowed through the half-cells as the redox reaction occurs, often with an external pumping system. In this manner, the membrane in a flow cell battery operates in an aqueous electrolyte environment. In some applications, an iron-ion containing aqueous hydrochloric acid solution may be used as the catholyte, while a chromium-ion containing aqueous hydrochloric acid solution may be used as the anolyte. In some applications, a mixture of chromium and iron containing solutions may be used on both sides of the redox cell. The use of mixed reactants eliminates the requirement for a highly-selective membrane since the electrolyte composition of both half cells is identical in the discharged state.

Typically, the charging and discharging of the redox flow battery results in a disparity of states of charge between the two electrolyte solutions. Parasitic reactions competing with the reduction of certain ions may result in formation of unwanted side products. For example, in the case of acidic electrolytes, certain parasitic reactions may generate hydrogen gas.

Therefore, there exists a need to develop a redox cell system that effectively removes or recycles parasitic side products produced during the charge/discharge cycles of a flow cell battery to rebalance the charge states between the two electrolytic solutions.

SUMMARY OF THE INVENTION

In an embodiment, a redox flow cell battery system includes a redox flow cell and a rebalance system coupled to the redox flow cell. The rebalance system includes at least one electrochemical rebalance cell placed in fluid communication with at least one photochemical cell that includes at least one source of ultraviolet radiation. In some embodiments, the redox flow battery system further includes at least one anolyte reservoir that includes an aqueous anolyte solution. In some embodiments, the anolyte solution includes an acid and at least one metal salt. In some embodiments, the redox flow battery system further includes at least one catholyte reservoir including a catholyte solution.

Consistent with some of the embodiments described herein, a rebalance cell and methods of using the same are provided. In some embodiments, the rebalance cell includes at least one source of ultraviolet radiation, at least one anolyte solution, at least one catholyte solution, an anode compartment and a cathode compartment separated by a membrane, and an electrode disposed in each of said anode and cathode compartments. In some embodiments, the at least one anolyte solution includes an aqueous acid and at least one metal salt. In some embodiments, the at least one catholyte solution also includes an aqueous acid and at least one metal salt.

In certain embodiments described herein, a rebalance system including at least one rebalance cell is described. In some embodiments, the rebalance system further includes at least one anolyte reservoir that includes at least one aqueous anolyte solution. In some embodiments, the at least one anolyte solution includes an acid and at least one metal salt. In some embodiments, the rebalance system further includes at least one catholyte reservoir containing at least one aqueous catholyte solution. In some embodiments, the at least one rebalance cell of the rebalance system is placed in fluid communication with at least one source of $H_2$ gas. In some embodiments, the at least one source of $H_2$ gas is a redox flow cell.

BRIEF DESCRIPTION OF THE DRAWINGS

Advantages of the present invention will become apparent to those skilled in the art with the benefit of the following detailed description of embodiments and upon reference to the accompanying drawings in which.

Figure 1A:
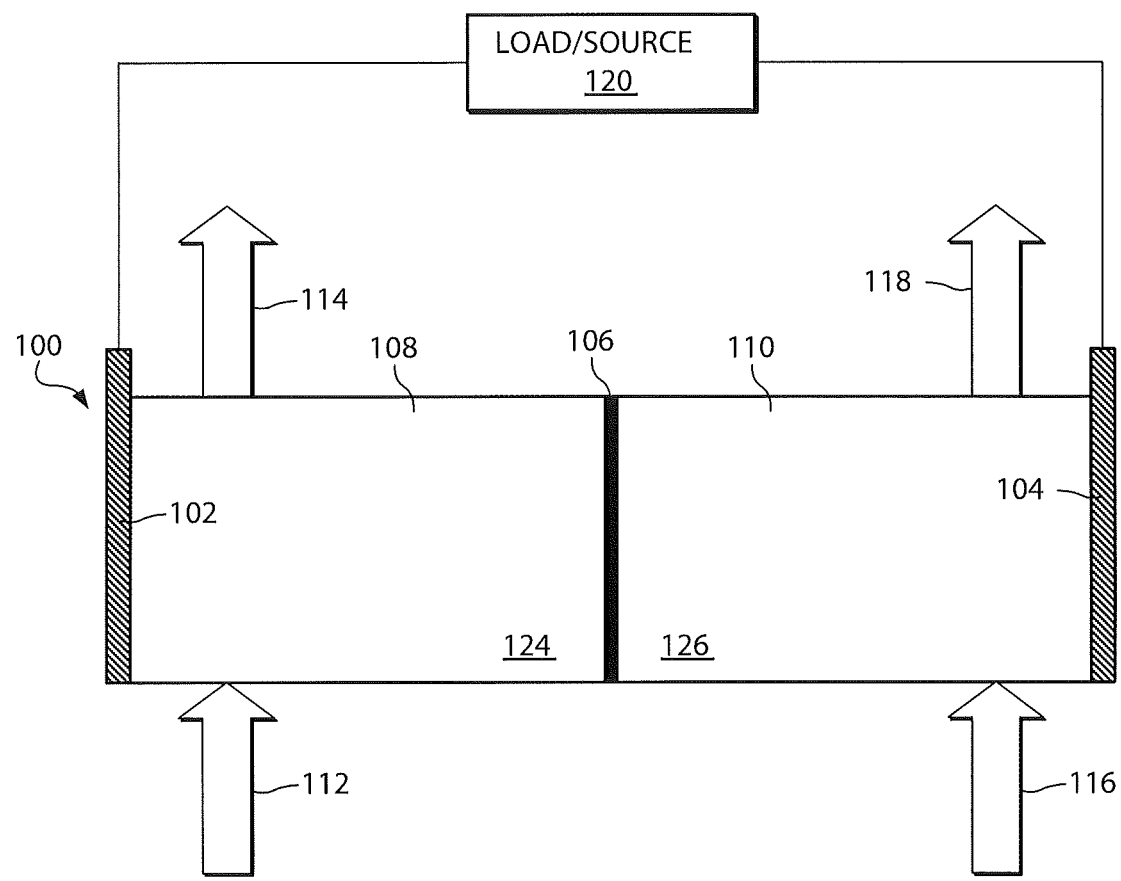
FIG. 1A depicts a redox flow cell filled with electrolyte.

Where possible in the figures, elements having the same function have the same designation.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise.

As used in the present specification, the following words and phrases are generally intended to have the meanings as set forth below, except to the extent that the context in which they are used indicates otherwise.

As described herein, the term "cell" refers generally to any unit capable of performing electrochemical energy conversion. Exemplary cells include, but are not limited to, redox flow batteries, fuel cells, and secondary batteries.

As described herein, the term "membrane" refers to any material that forms a barrier between fluids, for example between electrochemical half-cells (e.g., an anode compartment and a cathode compartment). Exemplary membranes may be selectively permeable, and may include porous membranes and ion-selective membranes. Exemplary membranes may include one or more layers, wherein each layer exhibits a selective permeability for certain species (e.g., ions), and/or effects the passage of certain species.

As described herein, the term "fluid communication" refers to structures which are in contact with, but not necessarily affixed to, one another, whereby a fluid or gas can pass from one structure to the other. For example, two structures may be in fluid communication with one another by a channel, conduit, opening, and/or valve, even if the communication includes a valve in a closed state but provided that the valve can be opened, whereby a fluid or gas can be moved from one of the structures to the other. In addition, two structures may be considered to be in fluid communication with each other even in circumstances where one or more intermediate structures divert and/or interrupt the flow of the fluid or gas from the first structure to the second structure, so long as flow of the fluid or gas from the one or more intermediate structures to the second structure is ultimately possible.

As described herein, the "chromium side" of a cell refers generally to the negative side of a Cr/Fe based redox flow cell. In some embodiments, the oxidation of chromium occurs at the chromium side of the cell.

As described herein, the "iron side" of a cell refers generally to the positive side of a Cr/Fe based redox flow cell. In some embodiments, the reduction of iron occurs at the iron side of the cell.

FIG. 1 illustrates a schematic drawing of a simplified redox flow cell battery system 100. As shown, redox flow cell system includes redox flow cell 100, which includes two half-cells 108 and 110 separated by a membrane 106. An electrolyte 124 is flowed through half-cell 108 and an electrolyte 126 is flowed through half-cell 110. Half-cells 108 and 110 include electrodes 102 and 104, respectively, in contact with electrolytes 124 and 126, respectively, such that redox reactions occur at the surface of the electrodes 102 or 104. In some embodiments, multiple redox flow cells 100 can be electrically coupled (e.g., stacked) either in series to achieve higher voltage or in parallel in order to achieve higher current. As shown in FIG. 1, electrodes 102 and 104 are coupled across load/source 120, through which electrolytes 124 and 126 are either charged or discharged.

When filled with electrolyte, half-cell 110 of redox flow cell 100 contains anolyte 126 and the other half-cell 108 contains catholyte 124, the anolyte and catholyte being collectively referred to as electrolytes. Reactant electrolytes may be stored in separate reservoirs and dispensed into half-cells 108 and 110 via conduits coupled to cell inlet/outlet (I/O) ports 112, 114 and 116, 118 respectively. In some embodiments, an external pumping system is used to transport the electrolytes to and from the redox flow cell. Electrolyte 124 flows into half-cell 108 through inlet port 112 and out through outlet port 114, while electrolyte 126 flows into half-cell 110 through inlet port 116 and out of half-cell 110 through outlet port 118.

At least one electrode 102 and 104 in each half-cell 108 and 110 provides a surface on which the redox reaction takes place and from which charge is transferred. Suitable materials for preparing electrodes 102 and 104 generally include those known to persons of ordinary skill in the art. Redox flow cell 100 operates by changing the oxidation state of its constituents during charging or discharging. The two half-cells 108 and 110 are connected in series by the conductive electrolytes, one for anodic reaction and the other for cathodic reaction. In operation (e.g., during charge or discharge), electrolytes 126 and 124 (e.g., anolyte 126 or catholyte 124) are flowed through half-cells 108 and 110 through I/O ports 112, 114 and 116, 118 respectively as the redox reaction takes place.

Positive ions or negative ions pass through permeable membrane 106, which separates the two half-cells 108 and 110, as the redox flow cell 100 charges or discharges. Reactant electrolytes are flowed through half-cells 108 and 110, as necessary, in a controlled manner to supply electrical power or be charged by load/source 120. Suitable membrane materials for membrane 106 include, but are not limited to, materials that absorb moisture and expand when placed in an aqueous environment. In some embodiments, membrane 106 may comprise sheets of woven or non-woven plastic with active ion exchange materials such as resins or functionalities embedded either in a heterogeneous (such as co-extrusion) or homogeneous (such as radiation grafting) way. In some embodiments, membrane 106 may be a porous membrane having high voltaic efficiency Ev and high coulombic efficiency and may be designed to limit mass transfer through the membrane to a minimum while still facilitating ionic transfer. In some embodiments, membrane 106 may be made from a polyolefin material and may have a specified thickness and pore diameter. A manufacturer having the capability to manufacture these membranes, and other membranes consistent with embodiments disclosed, is Daramic Microporous Products, L.P., N. Community House Rd., Suite 35, Charlotte, N.C. 28277. In certain embodiments, membrane 106 may be a nonselective microporous plastic separator also manufactured by Daramic Microporous Products L.P. A flow cell formed from such a membrane is disclosed in U.S. Published Patent App. No. 2010/0003586, filed on Jul. 1, 2008, which is incorporated herein by reference.

Figure 1B:
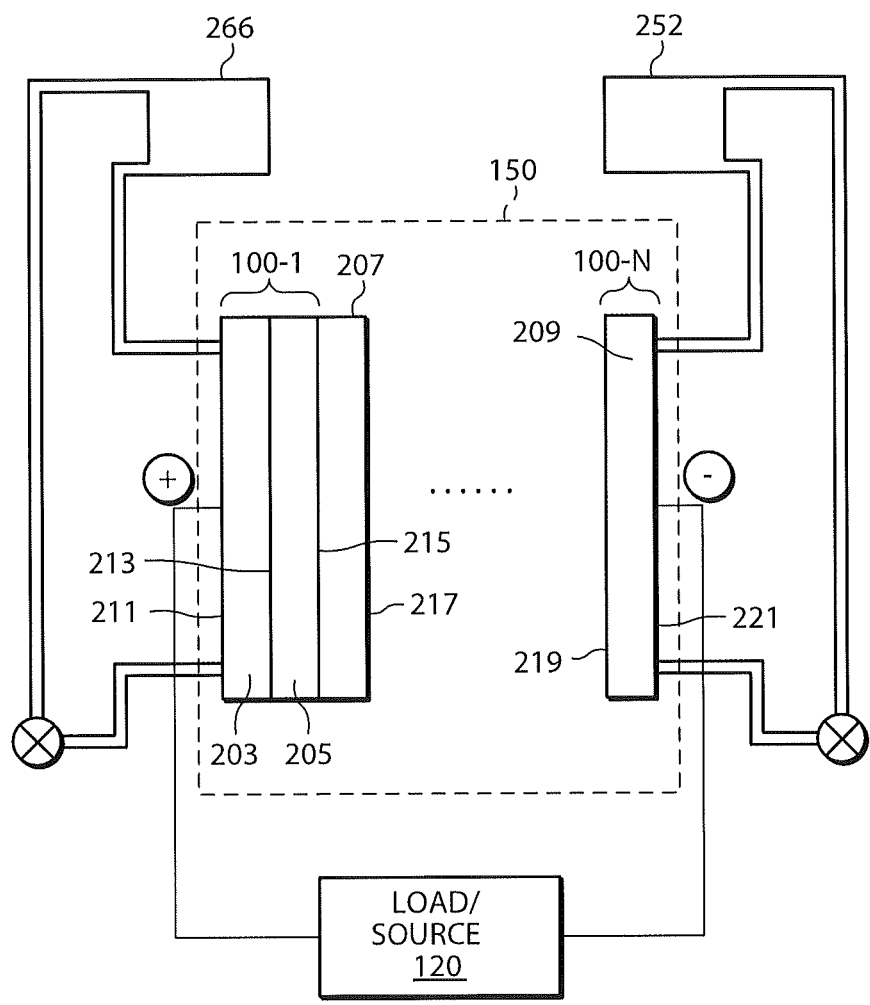
FIG. 1B depicts a battery that includes a stack of redox flow cells.

As illustrated in FIG. 1B, in some embodiments, multiple ones of redox flow cell 100 may stacked to form a redox flow cell battery system 150. Stacked redox flow cell battery 150 includes one or more redox flow cells 100, cells 100-1 through 100-N are shown. Each of cells 100-1 through 100-N includes two half-cells, exemplified by half-cells 203, 205, 207, and 209 in FIG. 1B. End half-cells 203 and 209 may be coupled across load/source 120. If battery 150 includes a single cell, half cell 203 corresponds with half-cell 108 and half cell 209 corresponds with half cell 110. FIG. 1B shows that there may be any even number of half cells, and thus any number of cells 100, in battery 150.

As further shown in FIG. 1B, each of half cells 203, 205, 207, and 209 is formed between pairs of elements 211, 213, 215, 217, and 219. In FIG. 1B, for example, half cell 203 is formed by elements 211 and 213; half cell 205 is formed by elements 213 and 215; half cell 207 is formed by elements 215 and 217; and half cell 209 is formed by elements 219 and 221. In a two cell embodiment, element 219 and element 217 are the same element. In a single cell embodiment, cells 205 and 207 would be absent and element 219 and 213 would be the same. Elements 211 and 221 form end plates and each include electrodes. End plate electrodes are further discussed in U.S. Published Patent App. No. 2010/0092807, which is incorporated herein by reference. In forming the remainder of battery 150, element 213 includes a membrane; element 215 includes an electrode; element 217 includes a membrane; and element 219 includes a membrane. In such fashion, multi-cell battery 150 is formed. Construction of a flow cell stack is described in U.S. patent application Ser. No. 12/577,134, entitled "Common Module Stack Component Design" filed on Oct. 9, 2009, which is incorporated herein by reference.

In some embodiments, electrolytes sourced from external reservoirs can be flowed through separate half cells. For example, catholyte from catholyte reservoir 266 flows through half cells 203 and 207 while anolyte from anolyte reservoir 252 flows through half cells 205 and 209. Elements 211, 213, 215, 217, 219, and 221, therefore, each include either a membrane or an electrode and controls the flow of the appropriate electrolyte into half cells 203, 205, 207, and 209.

In some embodiments, elements 211 and 221 of end half-cells 203 and 209, respectively, each include a pre-molded frame and an end-plate assembly that includes an electrode. In some embodiments, elements 211 and 221 can be structurally similar, but oriented opposite of each other, as is further discussed below. Consistent with embodiments of the present invention, elements 213, 215, 217, and 219 all include frames that are structurally identical, with either a membrane or an electrode attached to the frame.

In some embodiments of redox flow cell 100 in FIG. 1A, electrolyte 124 includes an aqueous acid solution. In some embodiments, the acidic solution includes aqueous hydrochloric acid. Electrolyte 124 further includes at least one metal salt (e.g., a metal chloride salt). In some embodiments, electrolyte 126 comprises an aqueous acid solution. In some embodiments, the acidic solution includes aqueous hydrochloric acid. Electrolyte 126 further includes at least one metal salt (e.g., a metal chloride salt).

In one embodiment, a redox flow cell battery system is based on a Cr/Fe redox pair. The remainder of the description will be based on a Cr/Fe redox flow cell battery, however, it should be understood that the concepts described herein may also be applied to other metals. In an embodiment of a Cr/Fe redox flow cell battery, both electrolytes 124 and 126 include a solution of $FeCl_2$ and $CrCl_3$ in aqueous HCl.

In some embodiments, the redox pairs of the a Cr/Fe redox flow cell battery include $Cr^{3+}/Cr^{2+}$ and $Fe^{3+}/Fe^{2+}$, respectively. Electrical energy is converted during charging into chemical energy through electrochemical reactions. The process is reversed on discharging. Those processes are reflected by the following:

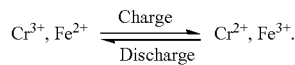

Anode: typically where oxidation occurs, in this case during discharge $Cr^{2+}$ oxidizes to $Cr^{3+}$. Cathode: typically where reduction occurs, in this case during discharge $Fe^{3+}$ reduces to $Fe^{2+}$. In cell 100 shown in FIG. 1A, electrolytes 124 and 126 may undergo the following reactions:

Charging:

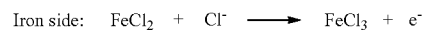

Discharging:

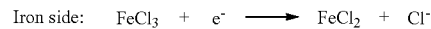

In this case, the $Cl^-$ ion (and $H^+$ generated in parasitic reactions) pass through membrane 106 and the electron $e^-$ flows through load/source 120.

The oxidation-reduction of the iron takes place at cathode 102, and that of chromium at anode 104. For this reason, acidic solutions are used for electrolytes 124 and 126, such as hydrochloric acid solutions containing iron chloride and chromium chloride.

In certain embodiments, catholyte 124 includes an aqueous solution of hydrochloric acid and $FeCl_2$, while anolyte 126 comprises an aqueous solution of hydrochloric acid and $CrCl_3$. In some embodiments, catholyte 124 may also include $CrCl_3$ and anolyte 126 may include $FeCl_2$ so that electrolyte 126 and electrolyte 124, upon being fully discharged, are the same electrolytic solutions.

Therefore, as discussed above, when source 120 supplies an appropriate positive voltage on cathode terminal 102 with respect to anode terminal 104, thereby charging the electrolytes in redox flow cell 100, the following reaction takes place:

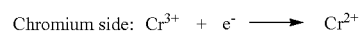

Applying the external power to charge the redox flow cell affects an electron transfer, while a $Cl^-$ ion crosses membrane 106 from anodic half-cell 110 to cathodic half cell 108 and/or $H+$ ions cross the membrane 106 from cathodic half-cell 108 to anodic half-cell 110. In an ideal solution, the fully charged redox flow cell is composed of a 100% $FeCl_3$ solution in cathodic half-cell 108 and 100% $CrCl_2$ in half-cell 110 on the anode side.

When the external power supply is replaced with a load, the redox flow cell begins to discharge and the opposite redox reactions take place:

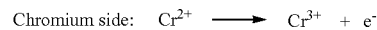

A fully discharged redox flow cell is, therefore, composed of a 100% $FeCl_2$ solution in catholyte 124, and a 100% active $CrCl_3$ solution in anolyte 126.

Certain parasitic reactions, however, also take place during the charge/discharge cycling of electrolytes 124 and 126, especially in the presence of impurities such as nickel that often accompany the iron chloride and chromium chloride salts. In particular, the production of hydrogen gas from $H^+$ in the aqueous acid solution of anolyte 126 competes with the anodic reduction of $Cr^{3+}$, resulting in the following parasitic reactions:

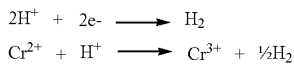

Typically, a marked difference between the state of charge of anolyte 126 and catholyte 124 develops over repeated cycles of charge and discharge. That is, while the cathodic conversion of $Fe^{2+}$ to $Fe^{3+}$ typically occurs at about 100% during a charge cycle, the anodic reduction of $Cr^{3+}$ to $Cr^{2+}$ occurs with less efficiency, depending on the purity of the electrolyte solution. In some cases, as exemplified here, 98% of the $Cr^{3+}$ can be reduced to $Cr^{2+}$:

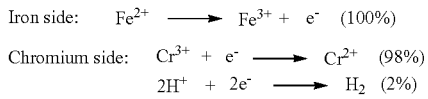

During a subsequent discharge cycle $Fe^{3+}$) is converted to $Fe^{2+}$ by addition of an electron from $Cr^{2+}$. During the discharge cycle, the conversion of $Fe^{3+}$ to $Fe^{2+}$ is therefore limited by the availability of $Cr^{2+}$ for conversion. Since only 98% of the $Cr^{3+}$ initially present is converted to $Cr^{2+}$ during charging, less than the full amount of $Fe^{3+}$ is converted to $Fe^{2+}$ during the discharge cycle. This reduction of charge capacity is carried on with each subsequent cycle, gradually reducing the charge capacity of the redox flow cell.

A rebalance system as described herein can be utilized to substantially restore the parity between the active iron components in catholyte 124 and the active chromium components in anolyte 126. In one embodiment, the restoration of parity between iron and chromium ions may be accomplished by placing the redox flow cell in fluid communication with a rebalance system including at least one electrochemical cell and at least one photochemical cell. The restoration of the charge ratio and acidic concentration of the electrolyte compositions may be effected, for example, through the reduction of $Fe^{3+}$ ions, since a further reduction of $Cr^{3+}$ ions will result in a lower current yield. The electrochemical reduction of $Fe^{3+}$ results in the formation of $Cl_2$ gas. However, the formation of $Cl_2$ in the electrochemical cell, coupled with the parasitic formation of $H_2$ that may take place at the anode of the redox cell, can potentially yield volumes of $H_2$ and $Cl_2$ gases. Given the hazards typically associated with $H_2$ and $Cl_2$ gases, the $H_2$ and $Cl_2$ gases may be removed to a separate reaction chamber for processing. Alternatively, it may be desirable to recycle those gases by converting them into HCl and using the formed HCl to restore acidity to the electrolyte solutions. Therefore, in some embodiments, the rebalance systems described herein will effect the removal of the $H_2$ and $Cl_2$ gases from the system and will recombine $H_2$ and $Cl_2$ to replenish the supply of HCl in the electrolytes, all while rebalancing the active ion ratios of anolyte 126 and catholyte 124.

Figure 2:
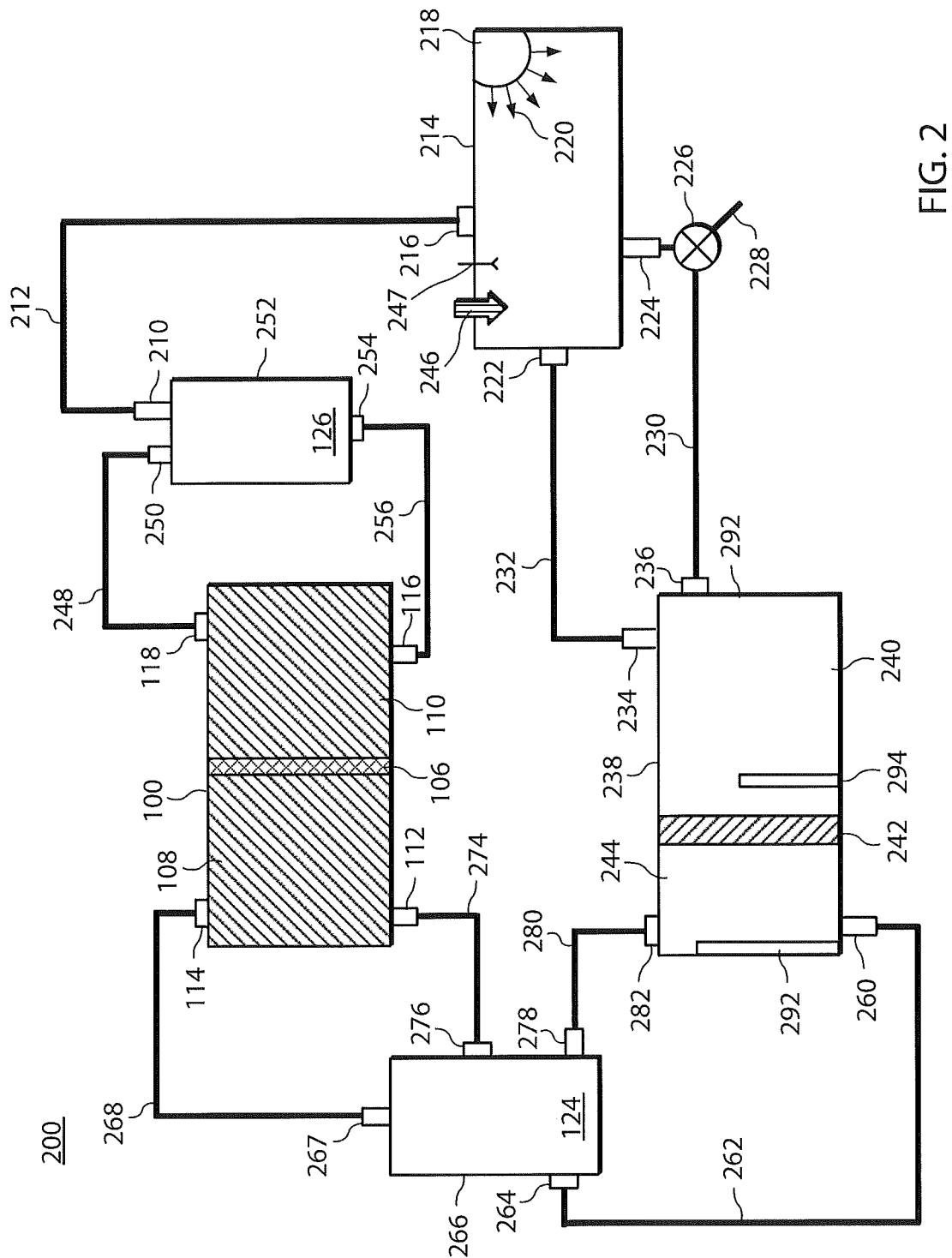
FIG. 2 depicts a redox flow cell coupled to a rebalancing system.

FIG. 2 illustrates a redox flow cell battery system 200. Redox flow cell battery system 200 includes redox flow cell 100, an electrochemical rebalance cell 238, and a photochemical cell 214. Redox cell battery 100 is shown with cathode compartment 108 and anode compartment 110, which are separated by membrane 106, as illustrated in FIG. 1A, but may include any number of individual cells as illustrated in FIG. 1B. Electrochemical rebalance cell 238 and photochemical cell 214 form the rebalance system. $H_2$ produced in anode compartment 110 may be transferred from redox cell 100 through conduit 248 and into anolyte reservoir 252, which also contains anolyte 126. From there, $H_2$ may be vented from outlet 210 to photochemical cell 214 of the rebalance system. Vented $H_2$ may be carried along conduit 212 and into photochemical cell 214 via inlet 216. Electrochemical cell 238 includes anode compartment 244 and cathode compartment 240. Disposed therein are anode 294 and cathode 292. Suitable anode and cathode materials are further described below with respect to FIG. 3.

As discussed above, the 1:1 charge ratio of the anolyte and catholyte solutions in certain redox cells may be restored through the reduction of $Fe^{3+}$ ions. Electrochemical rebalance cell 238 allows the reduction of $Fe^{3+}$ to $Fe^{2+}$ to be performed to restore the charge balance. Applying power to the electrodes of electrochemical rebalance cell 238 affects the reduction of $Fe^{3+}$ to $Fe^{2+}$ to restore the system charge balance. The reduction of $Fe^{3+}$ ions can take place in different ways. For example, the reduction of $Fe^{3+}$ ions may take place at cathode 292 of electrochemical rebalance cell 238 through the electrochemical generation of $Cl_2$ at anode 294:

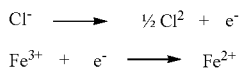

$Cl_2$ produced at anode 294 may be vented from electrochemical cell 238 through outlet 234. The vented $Cl_2$ may then be transported along conduit 232 and into photochemical cell 214 via inlet 222. In some embodiments, photochemical cell 214 houses ultraviolet source 218. Ultraviolet source 218 may be encapsulated by a shell to protect it from exposure to substances (e.g., $Cl_2$ and $H_2$) within photochemical cell 214. In some embodiments, the shell may be composed of quartz, glass, or a polymeric material capable of transmitting ultraviolet light at wavelengths sufficient to promote the reaction of $H_2$ and $Cl_2$ to form HCl. In some embodiments, ultraviolet source 218 may placed outside of photochemical cell 214, wherein ultraviolet source 218 is separated from the inside of photochemical cell 214 by a window. In some embodiments, the window is composed of quartz. In some embodiments, photochemical source 218 produces ultraviolet radiation 220, which may be used to effectively convert $H_2$ and $Cl_2$ present in photochemical cell 214 into HCl in the following manner:

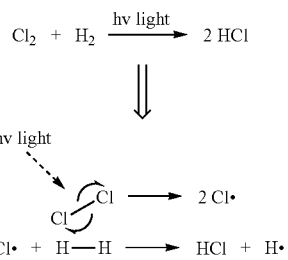

The HCl product formed in photochemical cell 214 may then be drained through outlet 224. Some embodiments may include a valve 226 that can be used to drain HCl out of rebalance system 200 via conduit 228. Alternatively, the HCl product of photochemical cell 214 may be directed through conduit 230 and into anode compartment 240 of electrochemical cell 238 via inlet 236.

An advantage of the use of a photochemical cell is the ability of the system to retain the $Cl_2$ lost during rebalancing of the charge ratio. If the $Cl_2$ was simply vented, the acidity of the electrolyte solutions would become reduced, which would alter the charge capacity and operating characteristics of the flow cell battery system. Use of a photochemical cell to regenerate HCl allows the acidity to be maintained by reintroducing acid that would have been lost during a rebalancing procedure.

In some embodiments, suitable sources of ultraviolet radiation may include sources that emit light having a wavelength from about 100 nm to about 450 nm. In some embodiments, ultraviolet radiation source 218 will emit light having a wavelength of about 370 nm to about 430 nm. In some embodiments, ultraviolet radiation source 218 emits light having a wavelength of about 390 nm to about 410 nm.

The temperature and pressure resulting from the operation of ultraviolet source 218 may be closely monitored by sensors 246. Sensors 246 may, for example, include temperature sensors of any type, such as thermocouples, thermistors, or any other device for measuring temperature. Sensors 246 may also include pressure sensors. In some embodiments, it may be desirable to keep the temperature below 200° C. during the conversion of $Cl_2$ and $H_2$. If a high temperature condition exists, battery system 200 may take action to lower the temperature.

HCl introduced into electrochemical cell 238 will dissociate into $H^+$ and $Cl^-$ in aqueous anolyte contained in anode compartment 240. Selectively-permeable membrane 242 may allow the transport of $H^+$ from anode compartment 240 into cathode compartment 244. Suitable materials for membrane 242 include those described below with respect to FIG. 3. The flow of $H^+$ into cathode compartment 244 will raise the catholyte level and decrease the concentration of the components of the catholyte. Catholyte levels and concentrations may be equilibrated by catholyte reservoir 266. Diluted catholyte may be drained from cathode compartment 244 through outlet 260. The diluted catholyte is transported along conduit 262 and into catholyte reservoir 266 via inlet 264. There, the diluted catholyte may be equilibrated and again dispelled via outlet 278. The equilibrated catholyte is then transported through conduit 280 and reintroduced into cathode compartment 244 via inlet 282.

Catholyte in cathode compartment 108 of redox cell 100 may be drained through outlet 112 and replenished in catholyte reservoir 266 via conduit 274 and inlet 276. Replenished catholyte 124 exits catholyte reservoir 266 though outlet 267, which is then transported through conduit 268 and reintroduced into cathode compartment 108 via inlet 114. Similarly, anolyte reservoir 252 feeds fresh anolyte from outlet 250 into anode compartment 110 via conduit 248 and inlet 118. Once depleted, the anolyte may be drained from anode compartment 110 through outlet 116 and transported along conduit 256 for reintroduction into anolyte reservoir 252 via inlet 254.

Alternatively, in some embodiments, the rebalance system may include a single rebalance cell where photochemical cell 214 is combined with anode compartment 240 of electrochemical rebalance cell 238, as described with respect to FIGS. 3 and 4 below. In some embodiments, the electrochemical rebalance cell may reflect the combination of an electrochemical cell and a photochemical cell, by incorporating at least one source of ultraviolet radiation in the electrochemical rebalance cell.

Figure 3:
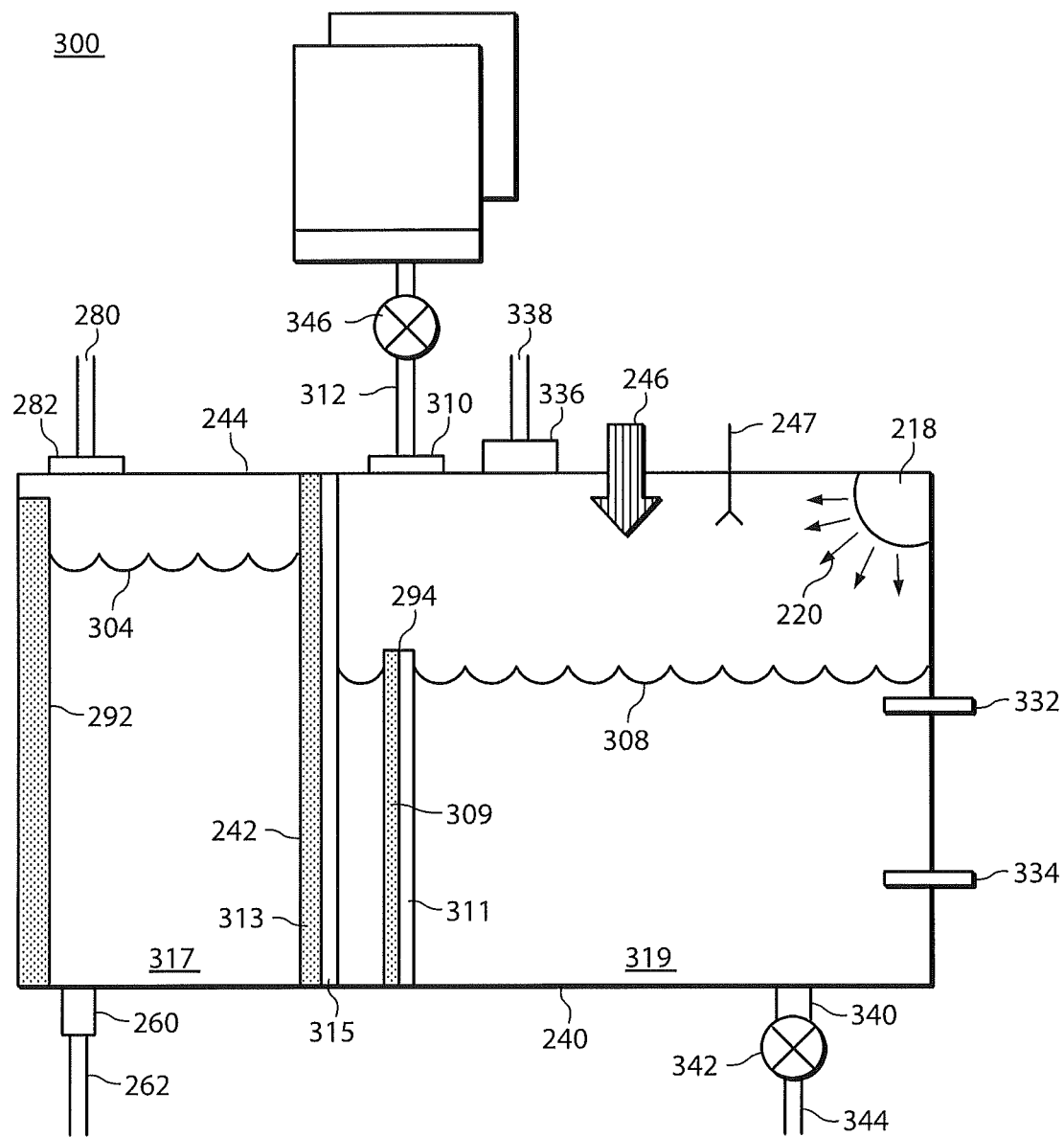
FIG. 3 depicts an embodiment of a rebalance cell.

FIG. 3 illustrates a combined rebalance cell where the anode compartment of an electrochemical rebalance cell also serves as the photochemical cell of the combined rebalance cell. Combined rebalance cell 300 includes cathode compartment 244 and anode compartment 240, which are separated by porous membrane 242. In some embodiments, porous membrane 242 comprises porous layer 313 and ion-selective layer 315. In some embodiments, membrane 242 may be selectively permeable for certain species.

Membrane 242 may be selected specifically to resist substantial degradation by aqueous $Cl_2$. In some embodiments, membrane 242 may comprise a polymeric base. Exemplary polymeric bases may include, but are not limited to, bases comprising polyethylene. In some embodiments, ion-selective layer 315 may comprise a polyfluorinated layer or a perfluorinated layer. In certain embodiments, ion-selective layer 315 may be selectively permeable to certain ionic species, such as $H^+$. Exemplary layers may include, but are not limited to, perfluorinated materials. In some embodiments, the perfluorinated materials may include one or more units having the following structure:

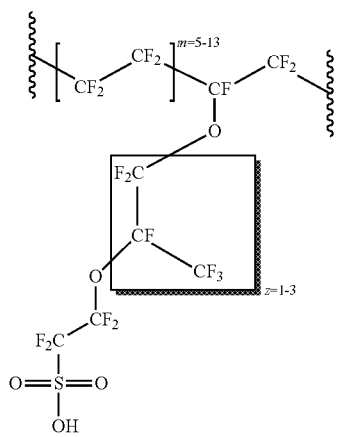

In some embodiments, ion-selective layer 315 may comprise a sulfonated tetrafluoroethylene based fluoropolymer-co-polymer such as Nafion®, manufactured by E. I. duPont de Nemours and Company of Wilmington, Del. In some embodiments, ionselective layer 315 may be further reinforced by a chemically-resistant material such as Teflon®.

Anode compartment 240 contains anode 294, while cathode compartment 244 contains cathode 292. In some embodiments, anode 294 may include a mixed metal oxide layer 309 disposed on metal substrate layer 311. In certain embodiments, anode 294 may include a mixed metal oxide without substrate layer 311. Anode 294 may be selected to resist substantial degradation from exposure to aqueous $Cl_2$. In some embodiments, anode 294 comprises a carbon or mixed-metal oxide disposed on a substrate. In some embodiments, the mixed metal oxide comprises ruthenium and titanium oxide. In some embodiments, the mixed metal oxide comprises iridium and ruthenium oxide. In some embodiments, the substrate is selected from titanium and titanium oxide. In some embodiments, the carbon or mixed-metal oxide may be disposed on the substrate in such a manner that allows at least some of the substrate to remain exposed after deposition of the carbon or metal oxide. In some embodiments, the carbon or mixed metal oxide and the substrate will form two separate and distinct layers.

Anode compartment 240 further holds electrolyte 319, the volume of which is indicated by electrolyte level 308. Space 314 defines the area between electrolyte level 308 and the top of anode compartment 240. When electrolyte 319 includes aqueous HCl, powering cell 300 will effect the formation of $Cl_2$ at anode 294, which then collects in space 314. $H_2$ from an external source (e.g., anolyte reservoir 252, FIG. 2) is also introduced into space 314 via conduit 338 and inlet 336. Anode compartment 240 further contains ultraviolet source 218, which may be used to expose space 314 to ultraviolet radiation 220. Ultraviolet source 218 may be encapsulated by a shell to protect it from exposure to substances (e.g., $Cl_2$ and $H_2$) within space 314. In some embodiments, the shell may be composed of quartz, glass, or a polymeric material capable of transmitting ultraviolet light at wavelengths sufficient to promote the reaction of $H_2$ and $Cl_2$ to form HCl. In some embodiments, ultraviolet source 218 may placed outside of anode compartment 240, wherein ultraviolet source 218 is separated from space 314 by a window. In some embodiments, the window is composed of quartz, quartz, glass, or a polymeric material capable of transmitting ultraviolet light at wavelengths sufficient to promote the reaction of $H_2$ and $Cl_2$ to form HCl. The exposure of $H_2$ and $Cl_2$ to ultraviolet radiation 220 effects the formation of HCl, which then dissociates in aqueous anolyte 319 as HCl. The heat and pressure resulting from the operation of ultraviolet source 218 may be closely monitored by sensors 246. In some embodiments, the anode compartment further includes a $Cl_2/H_2$ sensor 247 disposed therein to monitor the concentrations of $Cl_2$ and $H_2$ present in the rebalance cell.

In some embodiments, a $Cl_2/H_2$ sensor 247 may be disposed in photochemical cell 214 to monitor the concentrations of $Cl_2$ and $H_2$ present in the rebalance cell. Ideally, to safely control the reaction that occurs in photochemical cell 214, a chlorine rich environment is desired. In some embodiments, a chlorine/hydrogen concentration ratio may approach 2:1. However, an excessive amount of chlorine is also undesirable and therefore some embodiments may limit the amount of chlorine in the gas mixture. Sensor 247 can be utilized to monitor the concentration ratio of chlorine to hydrogen.

Figure 8:
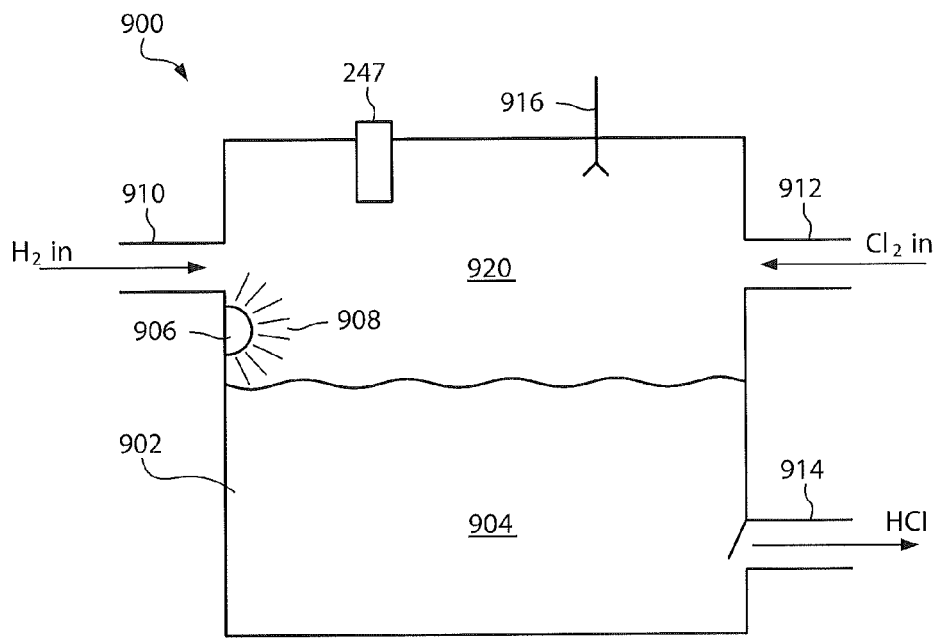
FIG. 8 depicts a gas concentration monitoring system.

FIG. 8 illustrates an exemplary system 900 that includes a gas monitoring system to measure the relative concentrations of a gaseous mixture. System 900 may be a portion of a combination rebalance cell or a photochemical cell that is used to produce HCl from a mixture of $H_2$ and $Cl_2$.

As shown in FIG. 8, system 900 includes a compartment 902 coupled to receive various substances into a space 920 from inlets 920 and 912. For example, in some embodiments, compartment 902 may receive $H_2$ gas via inlet 910 and $Cl_2$ gas via inlet 912. Compartment 902 may also include an ultraviolet source 906, which may be used to expose space 920 to ultraviolet radiation 908. The exposure of $H_2$ and $Cl_2$ to ultraviolet radiation 908 may effect the formation of hydrochloric acid (HCl) which may then be dissolved in an aqueous solution 904. Solution 904 may include pure water ($H_2O$), aqueous acidic solutions, or any other solution that will at least partially dissolve HCl. The heat and pressure resulting from the operation of ultraviolet source 906 may be closely monitored by a sensor 916. In some embodiments, sensor 916 may be coupled to various control and feedback systems such that temperature and pressure of compartment 902 may be maintained within a predefined operating range. As shown in FIG. 8, compartment 902 may also include an outlet 914 that is coupled to an external system to remove the aqueous HCl solution generated in compartment 902.

As discussed above, the exposure of $H_2$ and $Cl_2$ to ultraviolet radiation 908 affects the formation of HCl. However, a reaction involving $H_2$ and $Cl_2$ may be explosive if not performed in a controlled environment. Generally, a controllable $H_2$ and $Cl_2$ reaction may occur in a chlorine rich environment when the ratio $Cl_2:H_2$ is greater than 1. Given the hazards typically associated with $H_2$ and $Cl_2$ gases, in some embodiments, compartment 902 may include a sensor 947 that monitors the concentrations $Cl_2$ and $H_2$ and/or ratio of the ratio $Cl_2:H_2$ present in system 900.

Figure 9:
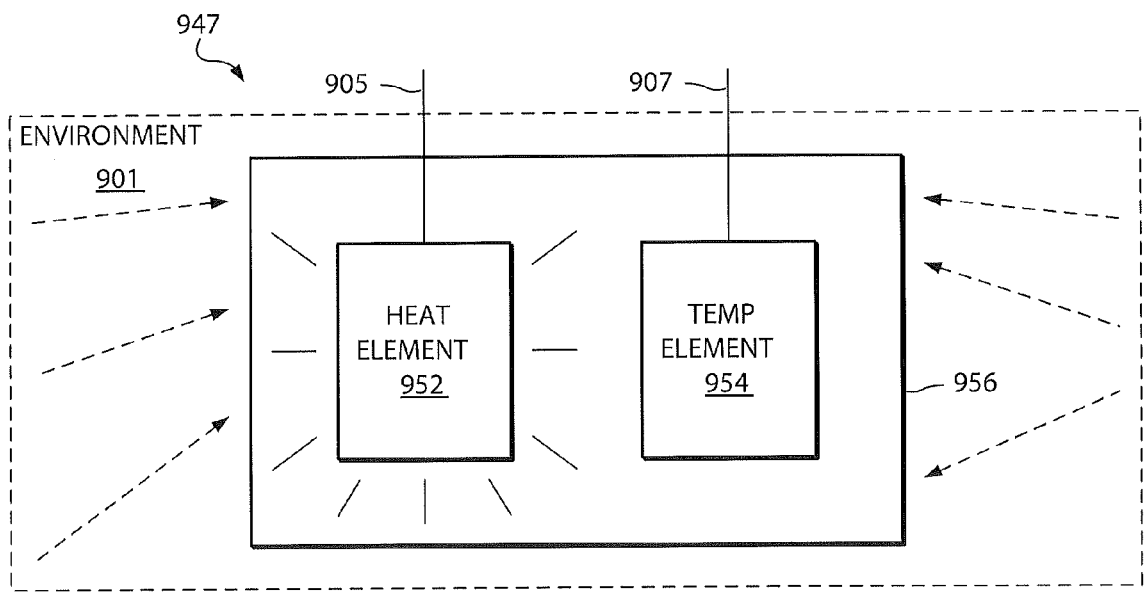
FIG. 9 depicts a concentration sensor.

FIG. 9 illustrates a block diagram of exemplary sensor 947 that may measure the ratio of $H_2:Cl_2$ (or $Cl_2:H_2$) in a given environment 901. For convenience, the following description discusses the use and operation of sensor 947 to measure the ratio $H_2:Cl_2$ (or $Cl_2:H_2$) in a $H_2$, $Cl_2$ environment such as exemplary environment 901. However, it should be understood that sensor 947 may, in turn, be used in any setting involving the combination of $H_2$ and $Cl_2$ such as, in the generation of HCl from chloro-alkali plants, neutralization of $Cl_2$, or other such settings requiring a controlled $H_2$—$Cl_2$ reaction. Furthermore, it should be understood that the use of sensor 947 is not limited to that of a $H_2$ and $Cl_2$ environment, but may be used to measure a concentration or ratio of any (and any number) of gasses in a gaseous mixture.

As shown in FIG. 9, sensor 947 may include a heat element 952 and a temperature sensing element 954. Heat element 952 may include any heat source such as a resistive heating source, or any such element capable of generating net heat (power). Temperature sensing element 954 may include any temperature sensing element, including thermocouples, thermisters, IC sensors, IR sensors, or any other device capable of measuring a temperature close to heat element 952. As shown in FIG. 9, in order to resist substantial degradation by environment 901, heat element 952 and temperature sensing element 954 may be further encapsulated in an enclosure 956. Enclosure 956 may be formed, for example, from glass, plastic, metal, or any other type of material. Furthermore, heat element 952 may be coupled to generate net power (heat) by receiving a signal via line 905 (current or voltage signal), and temperature sensing element 954 may provide a temperature signal, which results from heating from heat element 952, via line 907.

During normal operation of sensor 947, heat generated by heat element 952 may be transferred to environment 901 and enclosure 956. The rate at which heat is transferred between heat element 952 and environment 901 may depend on the thermal resistivity of environment 901 and the thermal resistivity of enclosure 956. The thermal resistivity of enclosure 956 may depend on the type and physical characteristics of the material(s) used to create enclosure 956. Typically, materials that form enclosure 956 may be chosen such that their thermal resistivity is small (negligible) when compared with the environmental thermal resistivity. As is well known, the thermal conductivity of $H_2$ is much greater than the thermal conductivity of $Cl_2$ (by approximately a factor of 15). Therefore, a change in the concentration ratio $H_2:Cl_2$ in a $H_2$, $Cl_2$ mixture (such as in an anode compartment) may cause a significant change in the thermal resistivity of environment 901. For example, if the concentration of $H_2$ in the $H_2/Cl_2$ environment 901 increases, the thermal resistivity of environment 901 may decrease because the thermal conductivity of $H_2$ is much greater than the thermal conductivity of $Cl_2$ (as mentioned above). The decrease in the thermal resistivity of environment 901 may cause more heat from heat element 952 to be dissipated to environment 901, thereby cooling heat element 952. Similarly, if the concentration of $Cl_2$ in environment 901 increases, the thermal resistivity of environment

901 may increase which, in turn, may cause less heat from heat element 952 to be dissipated to environment 901. As will be discussed in detail below, by monitoring the heat transfer between heat element 952 and environment 901, for example, by monitoring the temperature close to heat element 952 (via temperature sensing element 954), a concentration ratio of $H_2:Cl_2$ may be estimated.

Figure 10:
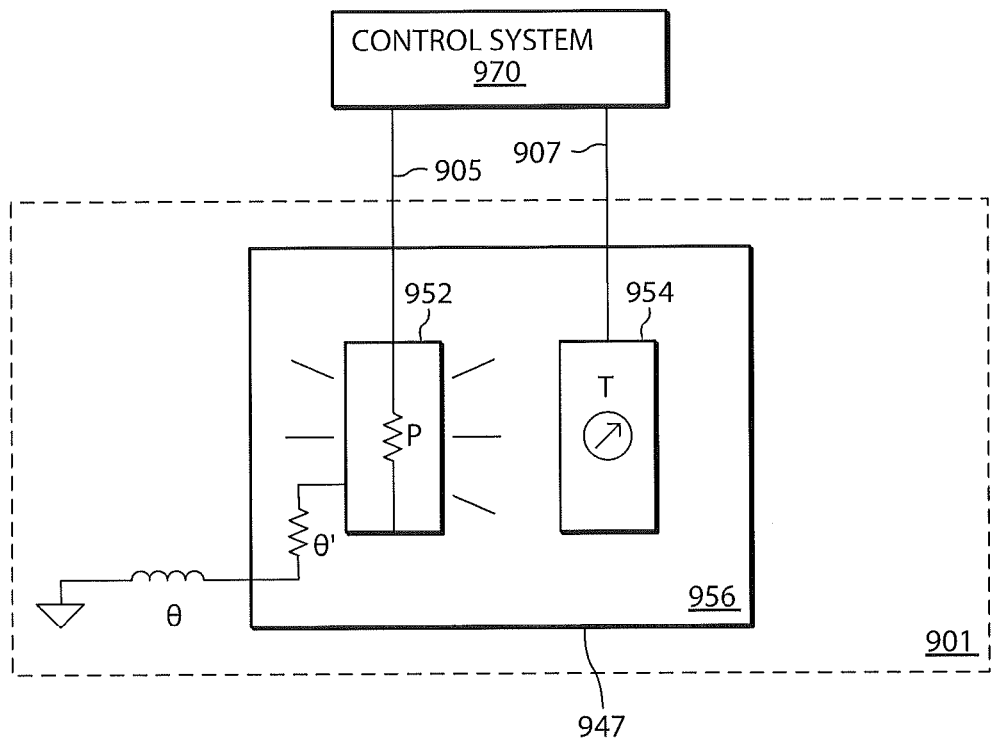
FIG. 10 depicts another embodiment of a concentration sensor.

FIG. 10 further depicts an equivalent thermal circuit diagram illustrating the operation of sensor 947. Enclosure thermal resistivity and environment thermal resistivity are depicted as (equivalent) resistors $\theta'$ and $\theta$, respectively. As discussed earlier, heat element 952 may generate a net power P by receiving (via line 905) a signal, such as a constant current, constant voltage, or any other signal capable of generating a net power across heat element 952. For example, heat element 952 may generate net heat P by receiving, from a known voltage source V, a current I via line 905. As discussed above, temperature sensing element 954 may provide (via line 907) a temperature reading T associated with heat element 952. It should be understood that temperature reading T may include any value that corresponds directly or indirectly to a given temperature sensed by temperature sensing element 954. For example, temperature reading T may include a value that may indicate the temperature sensed by temperature sensing element 954 or a value that may indicate the temperature sensed by temperature sensing element 954 relative to an ambient temperature. In some embodiments, when no heat is generated across heat element 952, temperature sensing element 954 may indicate an ambient temperature reading $T_a$ associated with environment 901.

As seen in FIG. 10, heat P generated by heat element 952 may be transferred to environment 901 and may raise the temperature at temperature sensing element 954 (temperature reading T). The temperature read by temperature sensing element 954 depends on the heat (power) P generated across heat element 952 and the heat transferred to environment 901. As discussed earlier, the rate at which heat P is transferred through environment 901 depends on the enclosure thermal resistivity $\theta'$ and environmental thermal resistivity $\theta$. As discussed above $\theta'$ may be negligible when compared with $\theta$, therefore;

$$T = \text{function}(P, \theta) \quad (1)$$

Furthermore, as discussed earlier with respect to FIG. 11, environmental thermal resistivity $\theta$ also depends on a ratio x of the concentrations of the $H_2$ and $Cl_2$ mixture. Therefore, $$T = \text{function}(P, \theta, x) \quad (2)$$

As seen from equation 2, ratio x of the $H_2$, $Cl_2$ concentration may be computed from temperature reading T received from temperature sensing element 954. As will be discussed in detail with respect to FIG. 6, in some embodiments, the relationship between $\theta$ and x is derived from one or more plots typically developed from laboratory measurements under controlled conditions. In some embodiments, corresponding values of $\theta$ and x derived from the plots mentioned above may be stored in a memory (not shown) that may be included as part of control and feedback circuitry 970.

Furthermore, in some embodiments, sensor 947 may be coupled to the control and feedback system 970 (via lines 905 and 907) and may be configured to calculate x based on temperature reading T and accordingly adjust the proportion (concentration) of $H_2$, $Cl_2$ in the mixture such that a controlled reaction may be maintained.

Figure 6:
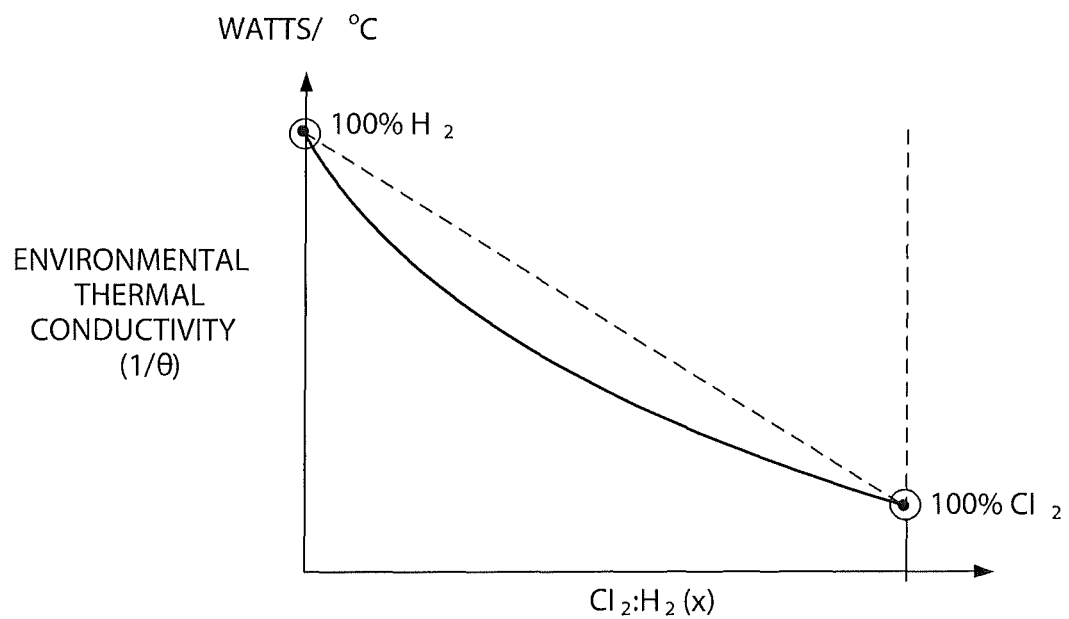
FIG. 6 depicts a plot that may be used by a sensor system.

As mentioned above, FIG. 6 is an exemplary plot depicting the relation between environmental thermal conductivity ($1/\theta$) and ratio x. The plot depicts $Cl_2:H_2$ relative concentration ratio x on the x-axis and environmental thermal conductivity ($1/\theta$) on the y-axis. As seen in FIG. 6, for a given $\theta$, a corresponding value of ratio x may be obtained. Furthermore, as discussed above, corresponding values of $\theta$ and x derived from the plot depicted in FIG. 6 and may be stored in a memory included as part of relevant control and feedback circuitry 970.

Figure 11:
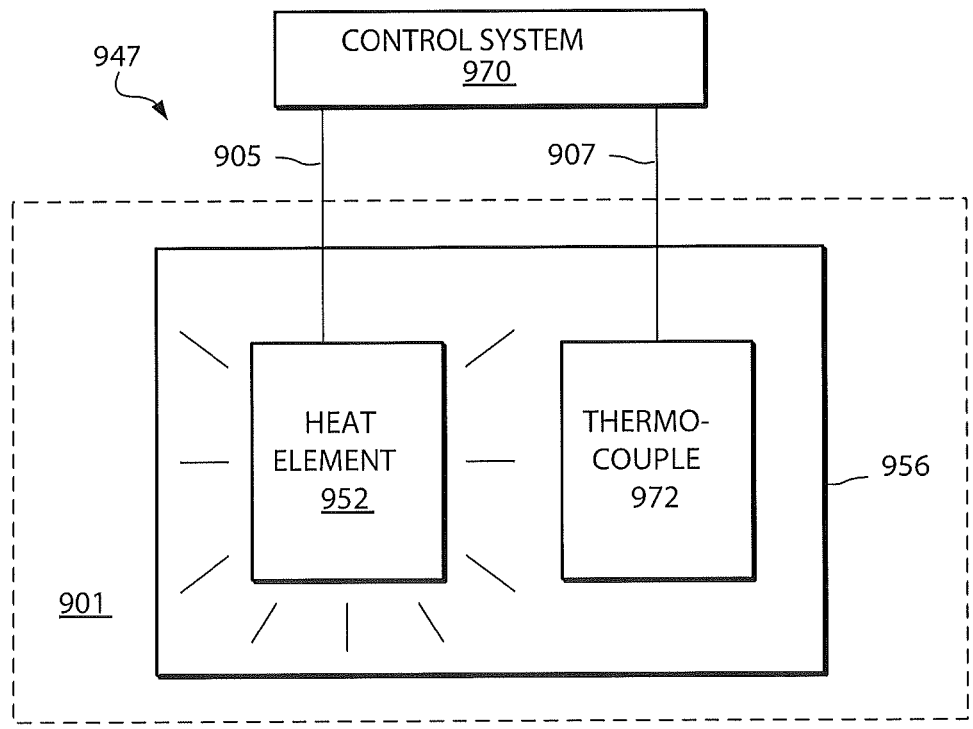
FIGS. 11, 12, and 13 depict various sensor systems.

FIG. 11 illustrates an alternate sensor 947. As shown in FIG. 11, temperature sensing element 954 is a thermocouple 972. Thermocouple 972 may be configured to provide a voltage reading V' (across line 907) in response to a temperature T sensed by temperature sensing element 954. In a manner similar to that discussed with respect to FIG. 10, a net power P may be generated across heat element 952. Furthermore, as environmental thermal resistivity $\theta$ changes due to a change in $H_2$ and $Cl_2$ ratio, the temperature sensed by thermocouple 972 may change which in turn may cause voltage reading V' to appear across line 907. In some embodiments, the relationship between V' and temperature T sensed by thermocouple 72 is derived from one or more plots typically developed from laboratory measurements under controlled conditions, as depicted in FIG. 6. In a manner similar to that discussed with respect to FIG. 6, in some embodiments, corresponding values of T and V' derived from the plots may be stored in a memory (not shown) that may be included as part of control and feedback circuitry 370. Furthermore, once temperature T is computed from voltage reading V', ratio x may be computed in a manner similar to that discussed with respect to equation 2, and control and feedback system 970 may accordingly adjust the proportion (concentration) of the $H_2$, $Cl_2$ in the mixture such that a controlled reaction may be maintained.

Figure 12:
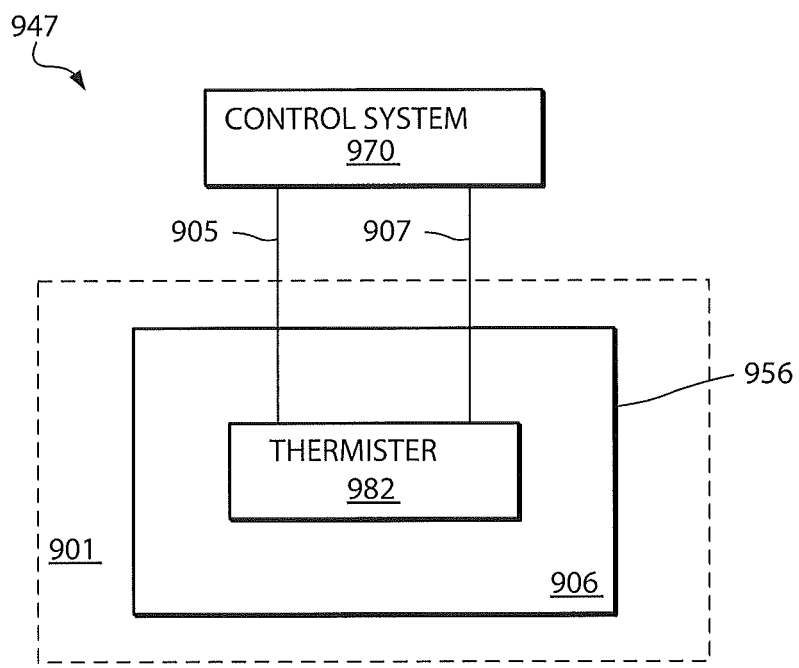

FIG. 12 illustrates a sensor 947 that is formed using a thermistor. As shown in FIG. 12, sensor 957 may include a thermistor 982 having a resistance R that varies as a function of a temperature T sensed by the environment surrounding the thermistor. Thermistor 982 includes both a heat element and temperature sensing element as shown in previous embodiments. In a manner similar to that discussed with respect to FIG. 10, a net power P may be generated across thermistor 982. For example, if net power P is generated across thermistor 982 from known voltage source V and current I, then:

$$P = I^2 * R \quad (3)$$

furthermore the relationship between R and T may be expressed by the Steinhart-Hart equation as:

$$\frac{1}{T} = \frac{1}{T_0} + \frac{1}{B}\ln\left(\frac{R}{R_0}\right) \quad (4)$$

where $R_o$ is the resistance of thermistor 982 at a reference temperature $T_0$ and B is a device constant. Typically, $R_0$, $T_0$, and B are included as part of the manufacturer's specifications associated with thermistor 982.

When no heat is generated across thermistor 982 (i.e. no signal is applied across line 905), resistance R of thermistor 982 corresponds to temperature $T_a$ of environment 901. When a heat P is generated across thermistor 982, then the heat transferred ($P_t$) between thermistor 982 and the surrounding environment may be expressed as:

$$P_t = K(T - T_a) \quad (5)$$

where K is the coefficient of heat transfer. Moreover, in an equilibrium condition:

$$P = P_t \quad (6)$$

therefore from equations 3, 4, and 5, $$I^2R = K[B/\text{Ln}(R/R_{inf}) - T_a] \quad (7)$$

where, $$R_{inf} = R_0 e^{-B/T_0}$$

Therefore, as can be seen from equation 7, because I, B, and $R_{inf}$ may be known quantities, $$R = \text{function}(K, T_a) \quad (8)$$

and because V=I*R(from Ohm's law), $$V = \text{function}(K, T_a) \quad (9)$$

Furthermore, because K is the heat transfer coefficient between thermistor 982 and environment 901, K is directly related to environmental thermal resistivity 8 (as discussed with respect to FIG. 10) which further depends on ratio x. Therefore, from equation 9:

$$V = \text{function}(x, T_a) \quad (10)$$

From equation 10, $H_2$ and $Cl_2$ ratio x is derived from known voltage source V and temperature $T_a$. In some embodiments, corresponding values of $T_a$ and V derived from equation 4 discussed above, may be stored in a memory (not shown) that, for example, is included as part of control and feedback circuitry 970. Furthermore, control and feedback system 970 may use the computed value of x, which may be utilized to adjust the proportion (concentration) of the $H_2Cl_2$ mixture such that a controlled reaction may be maintained.

Figure 13:
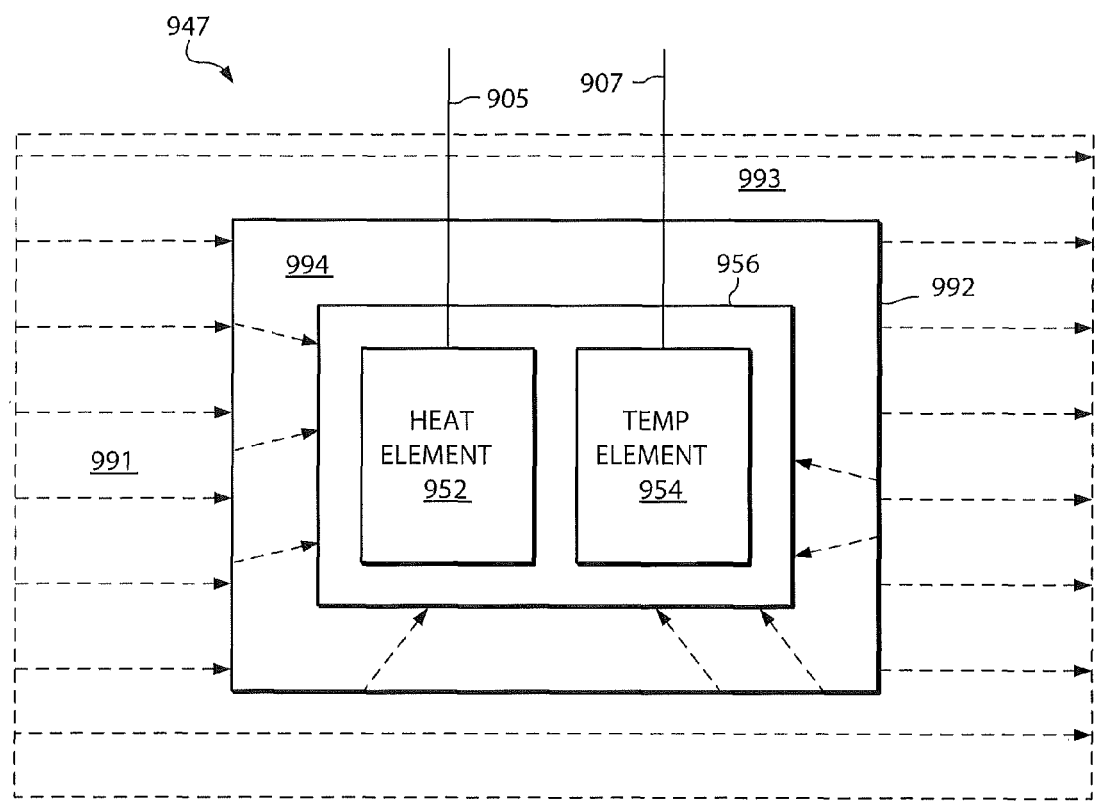

As discussed above with respect to FIGS. 9, 10, 11, and 12, sensor 947 may be used to monitor a relative concentration of a gaseous mixture that may be present in a static environment such as environment 901 that may be present in compartment 992. In some embodiments, it may be possible for environment 901 to be a dynamic environment wherein one or more gases (such as a $H_2$ and/or $Cl_2$) are moving at a constant and/or variable rate. FIG. 13 illustrates an embodiment of sensor 947 that may be used to monitor relative concentrations of a gaseous mixture in a dynamic environment 991. As shown in FIG. 13, sensor 947 may further include a porous membrane 992 that at least partially encapsulates enclosure 956 such that a space 994 exists between membrane 992 and enclosure 956. In some embodiments, membrane 992 may include a plastic membrane, or any other type of membrane that will allow gases from environment 991 to flow through it without affecting the relative concentrations of the gases. Furthermore, as gases flow through membrane 992, the environment encapsulated by membrane 992 (in space 993) may be similar if not identical to static environment 901 discussed with respect to FIG. 10. Therefore, in a manner similar to that discussed with respect to FIG. 10, a ratio x of the relative concentration of gases (such as $Cl_2:H_2$) in dynamic environment 991 may be calculated.

In some embodiments, the resulting increase in $H^+$ in anolyte 319 may be controlled by permeable membrane 242. Ion-selective layer 315 may affect the passage of $H^+$ into cathode compartment 244 and aqueous catholyte 317. This passage typically results in a drop of anolyte level 308 because of transmission of water along with the hydrogen ions. For example, about 4 to about 6 molecules of $H_2O$ may pass with each $H^+$ molecule that traverses membrane 242 into the cathode compartment 244. This passage results in a drop in electrolyte level 308, thereby concentrating the components of electrolyte 319. Conversely, the passage of $H_2O$ into cathode compartment 244 will cause a decrease in the concentration of the components dissolved in electrolyte 317.

In some embodiments, upper sensor 332 and lower sensor 334 are disposed in anode compartment 240 to detect and control electrolyte level 308. Once electrolyte level 308 reaches lower sensor 334, anode compartment 240 is drained through outlet 340, as controlled by valve 342. Electrolyte is then re-introduced into anode compartment 240 via conduit 244 through inlet 310 until electrolyte level 308 reaches upper sensor 332. In some embodiments, a valve 346 may control the introduction of electrolyte into anode compartment 240 through conduit 312. In some embodiments, valve 312 may remain open for some period of time after electrolyte begins to fill anode compartment 240 in order to flush compartment 240. Once anode compartment 240 is refilled, power is once again applied to electrodes 294 and 292 to saturate electrolyte 319 and begin production of chlorine gas.

Electrolyte 317 may be flowed through cathode compartment 244 so that cathode compartment 244 is always full. In some embodiments, electrolyte 319 and electrolyte 317 come from the same storage tank. In some embodiments, electrolyte 319 may be sourced from a separate tank.

Figure 4:
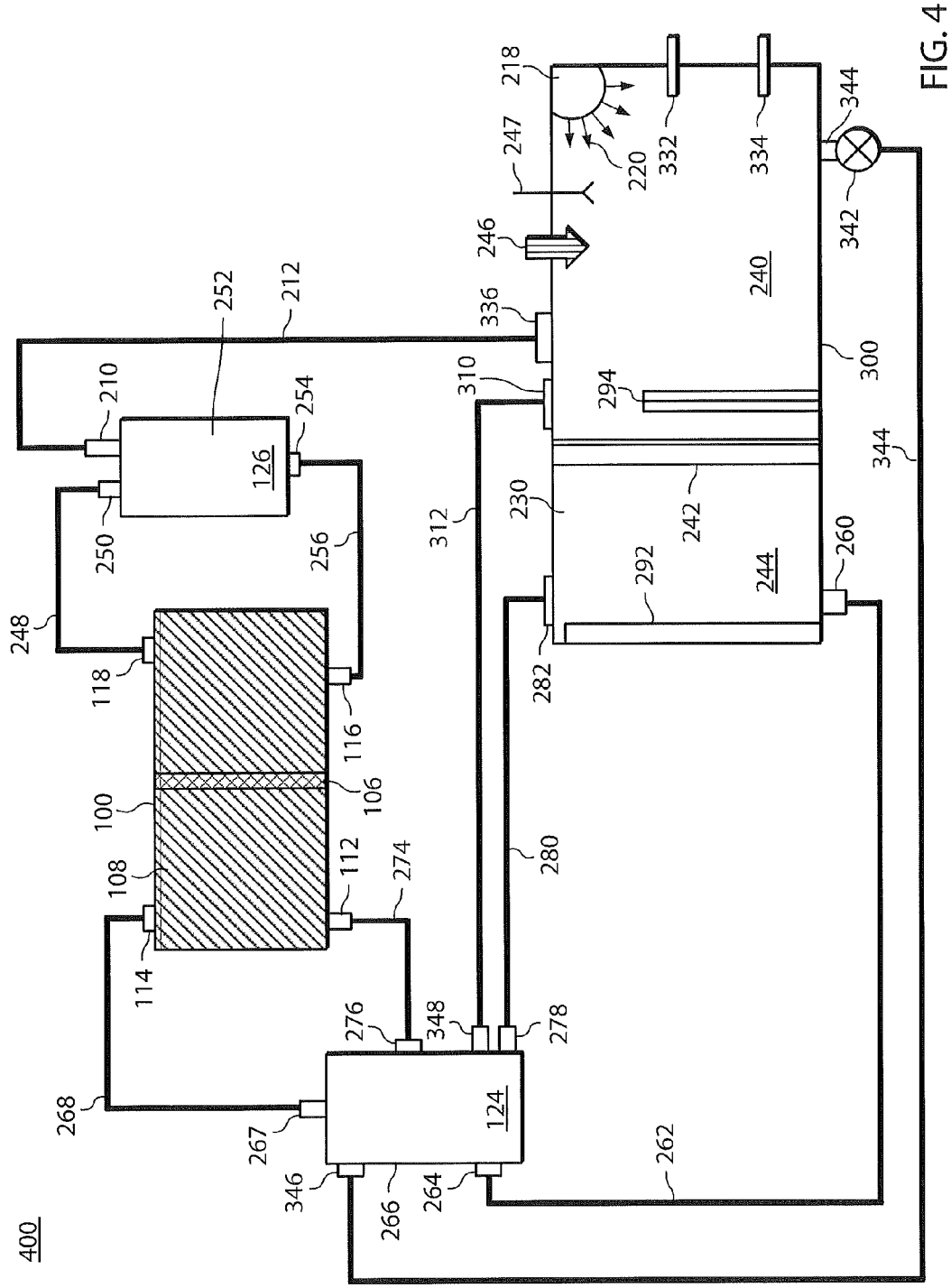
FIG. 4 depicts a redox cell coupled to a rebalancing system.

FIG. 4 illustrates a redox flow cell battery system 400 that includes redox flow cell 100 coupled to rebalancing cell 300. For convenience only, redox flow cell 100 is illustrated with a single cell that includes cathode compartment 108 and anode compartment 110 separated by membrane 106. $H_2$ produced in anode compartment 110 may be transferred from redox cell 100 through conduit 248 and into anolyte reservoir 252 through inlet 250, which also contains anolyte 126. From there, $H_2$ may be vented from outlet 210 and carried along conduit 212 and into anode compartment 240 of rebalance cell 300 via inlet 336. Rebalance cell 300 also houses cathode compartment 244. Anode compartment 240 and cathode compartment 244 are separated by porous membrane 242. Cathode compartment 244 contains cathode 292, while anode compartment 240 contains anode 294.

When anolyte in anode compartment 240 comprises aqueous HCl, the process of oxidation will effect the formation of $Cl_2$ at anode 294, which then collects at the top of anode compartment 240. $H_2$ introduced through inlet 336 also collects at the top of anode compartment 240. Anode compartment 240 includes ultraviolet source 218, which may be used to expose the $H_2$ and $Cl_2$ to ultraviolet radiation 220. Ultraviolet source 218 may be encapsulated by a shell to protect it from exposure to substances (e.g., $Cl_2$ and $H_2$) within anode compartment 240. As noted previously, the exposure of $H_2$ and $Cl_2$ to ultraviolet radiation 220 effects the formation of HCl, which then dissociates in the aqueous catholyte as $H^+$ and $Cl^-$. The heat and pressure resulting from the operation of ultraviolet source 218 may be closely monitored by sensors 246. $H_2$ and $Cl_2$ concentrations may be monitored through gas sensor 247.

Permeable membrane 242 may allow for the passage of $H^+$ into cathode compartment 244 and the aqueous catholyte contained therein. This passage typically results in a drop in the electrolyte volume in anode compartment 240. As described previously, the level of electrolyte in anode compartment 240 is controlled to be between lower sensor 334 and upper sensor 332. In some embodiments, a drop in electrolyte level detected by lower sensor 334 will stop the flow of power and effect the draining of electrolyte through outlet 340 and valve 342. From there, the electrolyte may be transported along conduit 344 and into catholyte reservoir 266 via inlet 346. Electrolyte may then be flowed from outlet 348 and along conduit 312 to refill anode compartment 240 via inlet 310. In some embodiments, valve 342 may remain open for some period of time after electrolyte begins to fill anode compartment 240 in order to flush compartment 240. Once anode compartment 240 is refilled, power is once again applied to electrodes 294 and 292 to begin production of chlorine gas.

In some embodiments, the refilling of anode compartment 240 may be accomplished by a second arm off of conduit 274. For example, in some embodiments, battery system 400 may lack conduit 312. Thus, in some embodiments, a second arm off of conduit 274 (not shown) may be implemented to effect the transfer of electrolyte to anode compartment 240 via inlet 310 for refilling. In some embodiments, valve(s) may be implemented to control the fill.

Passage of $H^+$ into cathode compartment 244 will result in a rise in the level of the catholyte and $H^+$ present therein. Restoration of the appropriate catholyte level may be achieved by draining a volume of the catholyte through conduit 262 via outlet 260. The catholyte is transported along conduit 262 and into catholyte reservoir 266 via inlet 264. There, the catholyte may be equilibrated and again dispelled via outlet 278. Equilibrated catholyte from catholyte reservoir 266 may be used to replace the catholyte drained from cathode compartment 244 through conduit 280 and inlet 282.

Alternatively, in some embodiments, catholyte from cathode compartment 244 may be placed in fluid communication with catholyte reservoir 266 by other means. For example, in some embodiments, redox battery system 400 may lack conduit 262. Thus, in some embodiments, a second arm off of conduit 274 may be implemented to affect the transfer of electrolyte from cathode compartment 244 to catholyte reservoir 266. In some embodiments, valve(s) may be implemented to control the transfer.

Catholyte in cathode compartment 108 of redox flow cell 100 may be drained through outlet 112 and replenished in catholyte reservoir 266 via conduit 274 and inlet 276. Replenished catholyte 124 exits catholyte reservoir 266 though outlet 267, which is then transported through conduit 268 and reintroduced into cathode compartment 108 via inlet 114. Similarly, anolyte reservoir 252 feeds fresh anolyte 126 from outlet 250 into anode compartment 110 via conduit 248 and inlet 118. Once depleted, the anolyte may be drained from anode compartment 110 through outlet 116 and transported along conduit 256 for reintroduction into anolyte reservoir 252 via inlet 254.

Alternative I/O port and conduit placements will be obvious to persons of ordinary skill in the art. For example, in some embodiments, inlet 346 may be placed at the top of catholyte reservoir 266, instead of the side as depicted in FIG. 4. Other rearrangements to I/O port and conduit placements depicted in FIG. 4 are obvious and have the ability to effect similar results.

Figure 5:
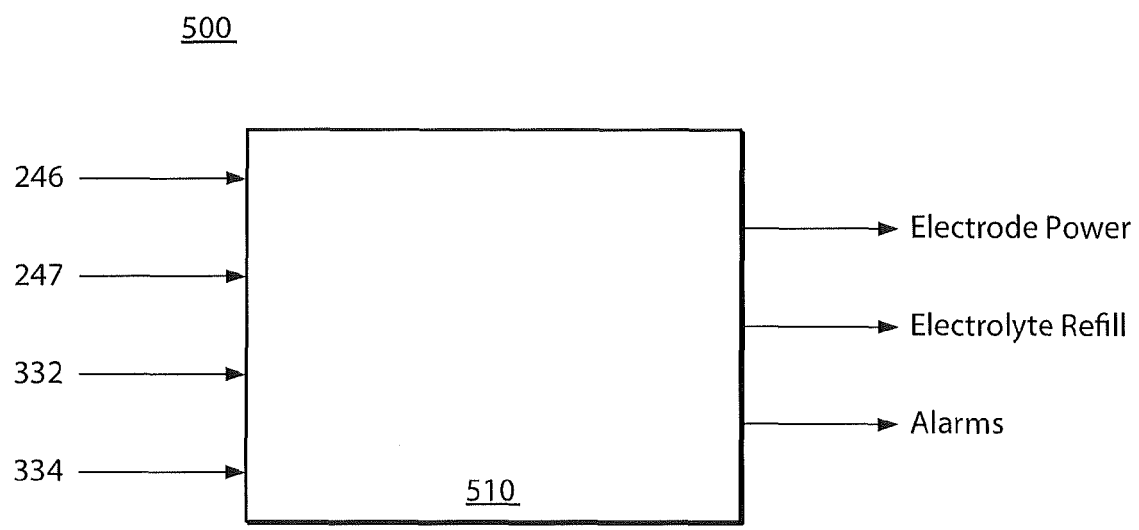
FIG. 5 depicts a control system for a rebalance cell such as that illustrated in FIG. 4.

FIG. 5 illustrates a control system 500 for controlling rebalance cell 300. An example of a control system, is described in U.S. patent application Ser. No. 12/790,793, filed May 28, 2010, entitled "Control System for a Flow Cell Battery", which claims priority to U.S. Provisional Patent Application No. 61/182,660 entitled "Control System for a Flow Cell Battery", filed May 28, 2009, both of which are incorporated herein by reference. As shown in FIG. 5, control system 30 500 includes a controller 510. Controller 510 includes one or more processors, volatile and non-volatile memory to store data and programming, input signal processing that may include analog to-digital converters to receive and digitize data, and output signal processing that may include digital-to-analog converters to provide variable signals as needed. As shown in FIG. 5, controller 510 may receive signals related to temperature and pressure from sensors 246, signals 5 related to the concentration of hydrogen to chlorine gas from sensor 247, a lower level sensor signal from lower sensor 334, and an upper level signal from upper sensor 332. From these input signals, controller 510 provides one or more signals to control the current between electrodes 292 and 294, provide alarms if an overpressure or over temperature situation develops, and controls the refill process to restore electrolyte levels in anode compartment 240. Further, 10 controller 510 may be coupled to a communication bus, through which the status of rebalance cell 228 may be reported and comments such as, for example, a rebalance on command signal, can be received from the control system that controls a redox battery system.

In an embodiment, a redox flow cell battery system includes a main processor, for controlling the operation of the redox flow cell and a rebalance cell processor for controlling the operation of the rebalance cell. Rebalance cell processor and main processor operate independently. In some embodiments, however, the main processor and the rebalance cell processor transfer state information. For example, if the rebalance cell is going into a shutdown state, the main controller is informed of this transition through communication with the rebalance cell processor. Under such circumstances the main processor will continue to operate the redox flow cell battery system until it deems it necessary to shut the redox flow cell battery system down. If, however, the main processor shuts down the redox flow cell battery system, the shutdown signal is sent from the main processor to the rebalance cell processor requesting a shutdown of the rebalance cell until the main processor restarts the rebalance cell system.

As discussed above, the production of chlorine can be governed by the ratio of hydrogen concentration to chlorine concentration present in anode compartment 240. In some embodiments, the ratio of chlorine to hydrogen is kept between about 1 or about 2. FIG. 6 illustrates the power applied to electrodes 294 and 292 as a function of the ratio of chlorine concentration to hydrogen concentration. For example, in some embodiments the function is parabolic.

Figure 7A:
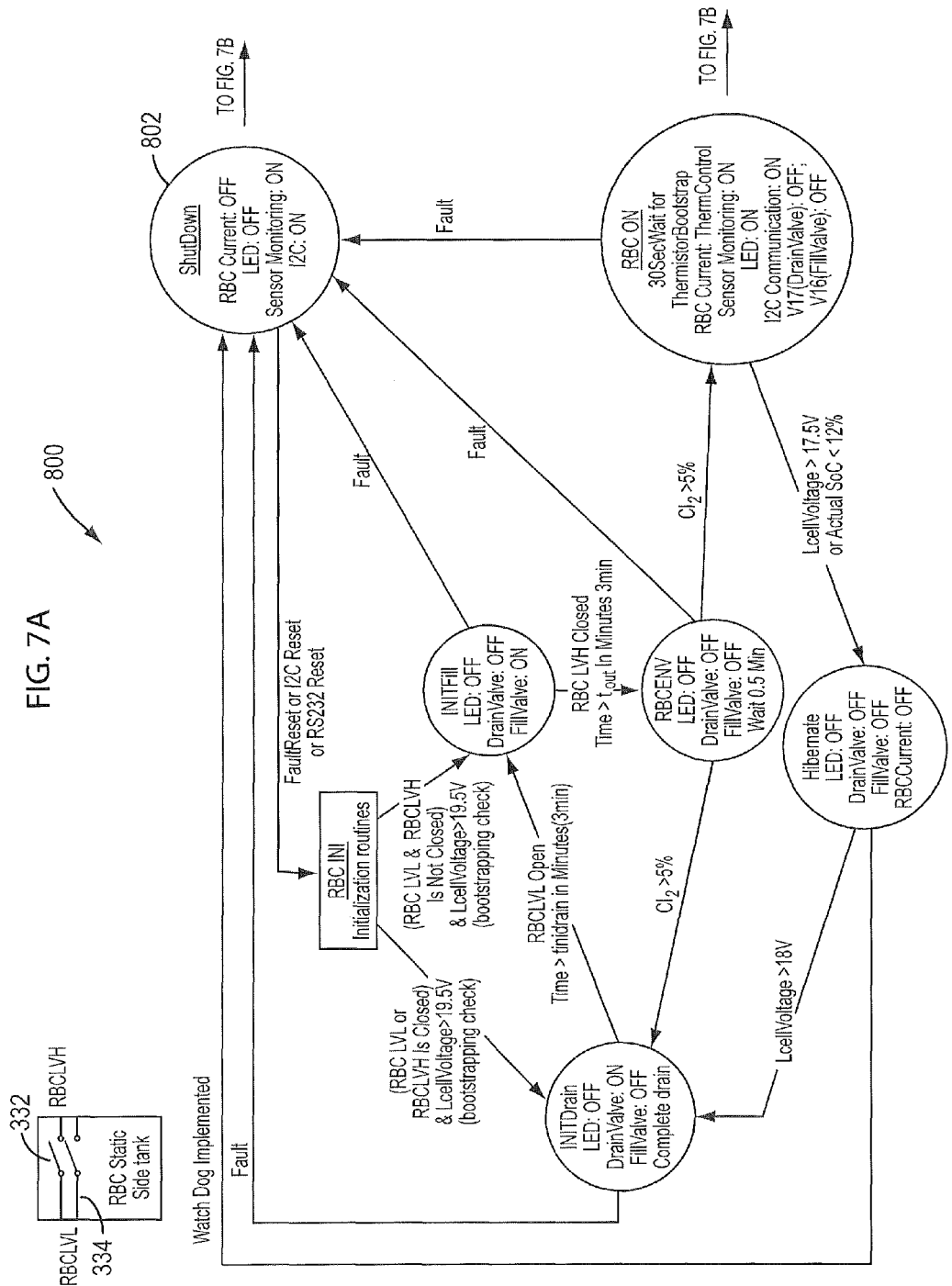
FIG. 7 depicts an embodiment of a state machine diagram that may be executed by the control system illustrated in FIG. 5.
Figure 7B:
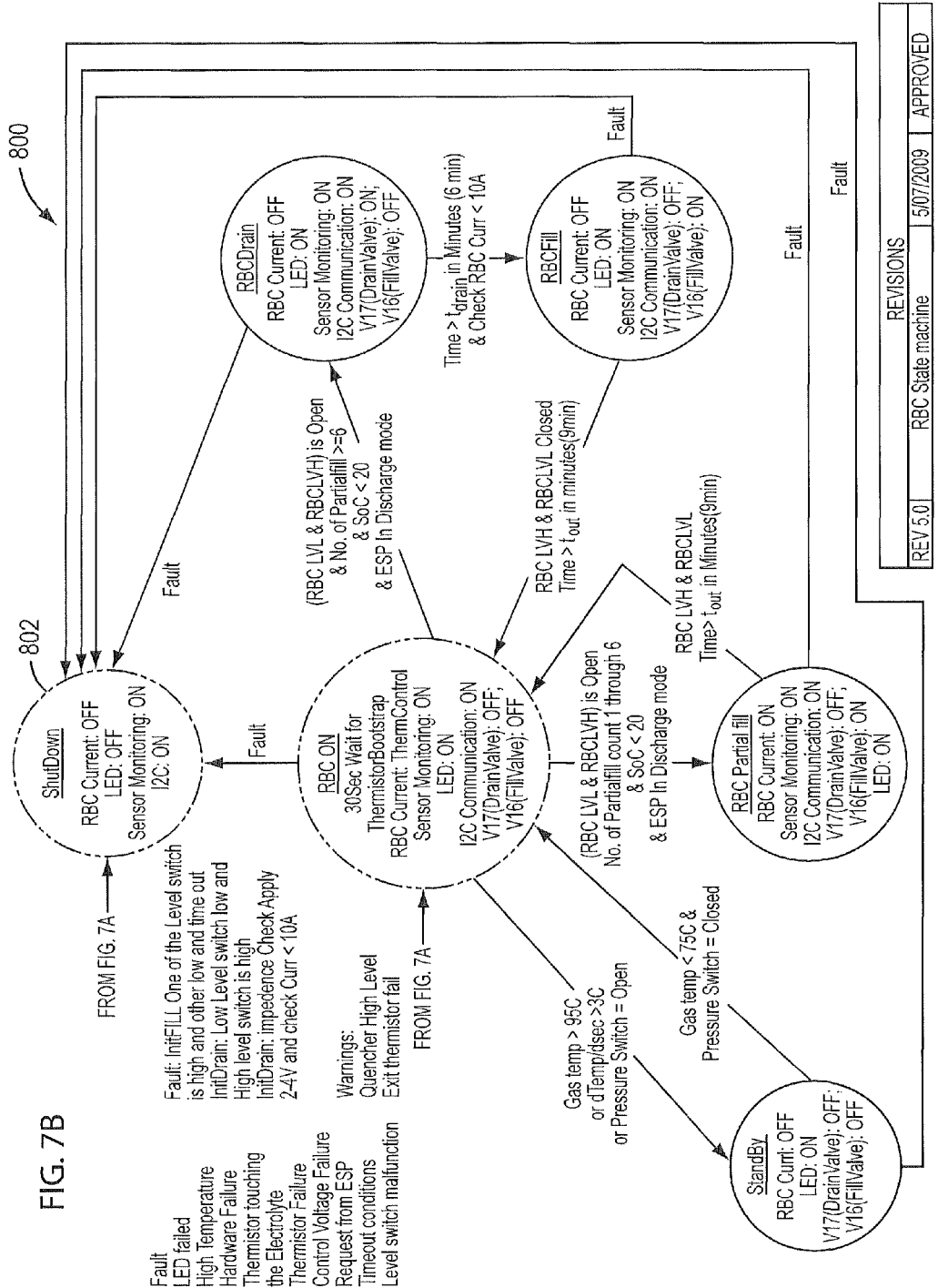

FIG. 7 illustrates an example of a state machine function 800 that may be executed by controller 510 illustrated in FIG. 5. State machine function 800 may be one embodiment of a processor-accessible storage medium configured to store instructions to be executed by a processor. Generally speaking, a processor-accessible storage medium may include any storage media accessible by a processor during use to provide instructions and/or data to the processor. For example, a processor accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LP-DDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include storage media accessible via a communication medium such as a network and/or a wireless link.

Controller 510 may begin in initialization state. From initialization state the controller cycles through fill and drain states to prepare for performing rebalance reactions. If the rebalance cell has fluids in the static side of the cell (e.g., the anode compartment), the controller transitions the rebalance system to the INITDrain state. In the INITDrain state, substantially all of the fluid in the rebalance system is drained from the static side. After the rebalance cell is drained, the rebalance system transitions to INITFill state. In INITFill state the compartments of the rebalance cell are filled with the iron side electrolytes. If the rebalance system does not have fluids in the compartments, the first INITDrain state may be skipped and the system may go directly to the INITFill state.

In order to ensure that proper initialization of the rebalance flow cell has occurred (e.g., quenching of the chlorine is complete), the rebalance system controller cycles through the INITDrain and INITFill cycles at least three times. The number of cycles taken are monitored when each INITFill stage has ended using the RBCENV state.

During initialization if lower level switch 334 is open and upper level switch 332 is open and the voltage across flow cell stack 100 is greater than a threshold voltage, for example 19.5 V, then controller 510 transitions to initial fill state INITFill. In INITFill, controller closes drain valve 342 and opens fill valve 346. If, in RBC INI, one or both of switches 334 and 332 are closed, then controller 510 transitions to drain state INITDrain where fill valve 346 is closed and drain valve 342 is opened. After a predetermined time, for example about three minutes, and if switch 334 is open, then controller 510 transitions to initial fill state INITFill. In initial fill state INITFill drain valve 342 is closed and fill valve 346 is opened until switch 332 closes, after which rebalance controller transitions to delay state RBCENV. In state RBCENV, valves 342 and 346 are both closed and a wait of a predetermined time, for example about five minutes, is initiated. If the chlorine gas level, as measured by sensor 247, increases above a threshold level, for example, about 5%, then controller transitions back to drain state INITDrain. Otherwise, once the wait period is over, the controller transitions to on state RBC ON. States INITFill and RBC ENV may also transition to a shutdown state ShutDown if a fault condition is detected.

Several states transition to shutdown state 802 when a fault condition is detected. Fault conditions include, for example, an LED current does not ramp up failure, a high temperature condition, a hardware failure, a failure of gas detection sensor or detection that the gas detection sensor is in contact with fluid, a control voltage failure, a request from the main processor, a timeout condition, a failure of switches, or some other fault. A signal received from the main controller directing that rebalance cell be shut down can also be interpreted as a fault resulting in a transition to shutdown state.

In on state RBC ON, valves 342 and 346 are off and rebalance current is supplied between electrodes 292 and 294. LED may be turned on to provide ultraviolet light to the rebalance cell to initiate the reaction of $H_2$ and $Cl_2$. As discussed above, the current supplied between electrodes 292 and 294, which results in $Cl_2$ production, can be controlled in response to measurements of the ratio of hydrogen to chlorine concentrations as detected by sensor 247. Further details regarding the reaction of $H_2$ and $Cl_2$ is described in U.S. Patent Application entitled "Methods of Producing Hydrochloric Acid from Hydrogen Gas and Chlorine Gas", filed concurrently herewith, which claims priority to U.S. Provisional Patent Application No. 61/182,335 entitled "Methods of Producing Hydrochloric Acid from Hydrogen Gas and Chlorine Gas", filed May 28, 2009, both of which are incorporated herein by reference.

If the voltage across cell stack 100 drops below a threshold value, for example about 17.5V, or the actual SOC is less than 12% then controller can transition rebalance system from on state RBC On to hibernate state Hibernate. In hibernate state 814, the current between electrodes 292 and 294 is shut off and the photochemical LED is shut off. When the voltage across cell stack 100 increases above a restart threshold value, for example 18 V, then the controller can transition to INITDrain and rebalance cell restarts. A drop of the voltage across redox flow cell 100 below the threshold value may indicate substantial discharge of redox flow cell 100 whereas an increase about the restart threshold value indicates the start of a charging cycle for redox flow cell 100.

From RBC On state, if the temperature measured by sensors 246 increases about a first temperature threshold (for example 95 C), or if the rate of temperature increase is greater than a rate threshold (for example 3 C/sec), or if the pressure as measured by sensor 246 increases about a pressure threshold, then controller 510 transitions to standby mode 816 where current between electrodes 292 and 294 is turned off. Once the temperature decreases below a second temperature threshold, for example 75 C, and the pressure decreases below a second pressure threshold, the controller may transition the rebalance cell back to on RBC On state. If a fault is detected, controller can initiate transition from standby mode RBC StandBy to shutdown state ShutDown.

From on state RBC_On, controller transitions the system to partial fill state RBC Partial fill when both low level switch 334 and high level switch 332 are open, a partial fill counter is less than a set value (for example six), the state of charge (SoC) is less than a threshold (for example 20%), and flow cell system is in discharge mode. In partial fill state RBC Partial fill, fill valve is opened until both low level switch 334 and high level switch 332 are closed, at which point controller transitions the system back to the RBC On state. Again, if a fault condition, or a timeout condition, is detected, controller transitions from partial fill state to shutdown. The RBC Partial fill state is used to rebalance the fluid level in the cell. The fluid level of the static compartment (240) gradually decreases due to transfer of water between compartments during rebalancing. In the RBC Partial fill state the static compartment 240 is filled with fluid until upper sensor shows that the chamber has been refilled.

Controller transitions to drain state RBC Drain when switches 332 and 334 are open, the number of partial fills is greater that the set value (for example six), the SoC is less than a threshold (for example 20%), and flow cell system is in discharge mode. In drain state RBC Drain, the rebalance current between electrodes 292 and 294 is shut off and drain valve 342 is opened. After a set period of time (for example greater than 6 minutes) and rebalance current less than a value, for example 10A, controller transitions from RBC Drain state to RBC Fill state. In RBC Fill state 820, drain valve 342 is closed and fill valve 346 is open. Controller transitions back to on RBC_On state when certain controller switches close or a time out has been reached (for example 9 minutes).

In ShutDown state, the rebalance current (the current supplied between electrodes 292 and 294 of the rebalance cell) is off and the UV LED light is off Controller may continue to monitor sensors 246, 247, and level sensors 334 and 332 and may continue to report the status of rebalance cell, as indicated by the sensors, through a communications bus, for example an I2C bus, to a system controller of a flow cell battery. If rebalance cell is turned on and there are no faults, or a fault reset has been received, through the communications bus, controller transitions to rebalance initialization state.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S.

patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A rebalance system, comprising:
at least one electrochemical cell that receives a catholyte solution from a catholyte storage reservoir;
at least one photochemical cell containing an anode compartment, a cathode compartment, and at least one source of ultraviolet radiation, the at least one photochemical cell coupled to receive a first gas from the at least one electrochemical cell and to receive a second gas from an anolyte storage reservoir; and
a controller coupled to the at least one electrochemical cell and the at least one photochemical cell, the controller receiving data from sensors and operating the rebalance system according to the data from the sensors,
wherein the at least one electrochemical cell and the at least one photochemical cell are in fluid communication with each other such that the at least one electrochemical cell receives an acid formed from the first gas and the second gas from the at least one photochemical cell;
wherein the at least one source of ultraviolet radiation is disposed in the anode compartment.

2. The rebalance system of claim 1, wherein at least one anolyte solution from the anolyte storage reservoir comprises at least the acid and at least one metal salt.

3. The rebalance system of claim 2, wherein the first gas is hydrogen, the second gas is chlorine, and the acid is HCl.

4. The rebalance system of claim 2, wherein the at least one metal salt is chromium chloride.

5. The rebalance system of claim 1, wherein the catholyte solution comprises at least the acid and at least one metal salt.

6. The rebalance system of claim 5, wherein the first gas is hydrogen, the second gas is chlorine, and the acid is HCl.

7. The rebalance system of claim 5, wherein the at least one metal salt includes iron chloride.

8. The rebalance system of claim 1, wherein the at least one source of ultraviolet radiation emits wavelengths of light from about 370 nm to about 430 nm.

9. The rebalance system of claim 8, wherein the at least one source of ultraviolet radiation emits wavelengths of light from about 390 nm to about 410 nm.

10. The rebalance system of claim 1, wherein the sensors include at least one gauge to monitor temperature and pressure of the photochemical cell.

11. The rebalance system of claim 1, wherein the sensors include at least one sensor to monitor the concentrations of $Cl_2$ and $H_2$ present in the photochemical cell.

12. The rebalance system of claim 1, wherein the at least one electrochemical cell comprises an anode compartment and a cathode compartment separated by a membrane; and an electrode disposed in each of said anode and cathode compartments.

13. The rebalance system of claim 12, wherein the membrane is a porous membrane.

14. The rebalance system of claim 13, wherein the porous membrane comprises a material that is not susceptible to substantial degradation by aqueous HCl.

15. The rebalance system of claim 13, wherein the porous membrane further comprises a layer facing the cathode compartment that is selectively permeable to Fr.

16. The rebalance system of claim 15, wherein the selectively-permeable layer is perfluorinated.

17. The rebalance system of claim 16, wherein the perfluorinated layer comprises at least one unit having the following structure:

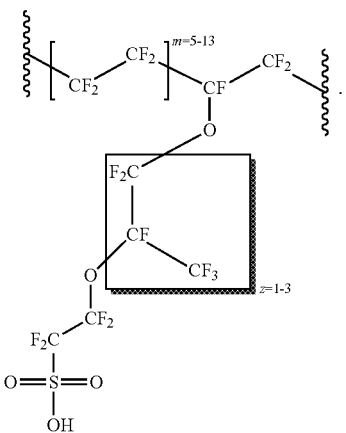

18. The rebalance system of claim 12, wherein the electrode in the cathode compartment of the at least one rebalance cell is not susceptible to substantial degradation by aqueous HCl.

19. The rebalance system of claim 12, wherein electrode comprises carbon or a mixed metal oxide disposed on a substrate.

20. The rebalance system of claim 19, wherein the substrate is titanium.

21. The rebalance system of claim 19, wherein the mixed metal oxide comprises iridium and ruthenium oxide.

22. The rebalance system of claim 19, wherein at least some of the substrate remains exposed after deposition of the carbon or mixed metal oxide.

23. The rebalance system of claim 1, wherein the first gas is hydrogen, the second gas is chlorine, and the at least one source of ultraviolet radiation is activated to effect the formation of HCl.

24. The rebalance system of claim 1, wherein the catholyte storage reservoir and the anolyte storage reservoir are in fluid communication with at least one redox cell.

25. A rebalance cell, comprising:
an anode compartment having an anode electrode;
a cathode compartment having a cathode electrode, the cathode compartment and the anode compartment being separated by a membrane;
at least one source of ultraviolet radiation disposed in the anode compartment;
at least one aqueous anolyte solution comprising at least one acid and at least one metal salt;

at least one aqueous catholyte solution comprising at least one acid and at least one metal salt; and
a controller coupled to the anode compartment, the cathode compartment, the at least one source, and at least one sensor, the controller operating the rebalance cell in response to the at least one sensor.

26. The rebalance cell of claim 25, wherein the at least one acid for both the anolyte and catholyte solutions is HCl.

27. The rebalance cell of claim 25, wherein the at least one metal salt of the at least one anolyte solution comprises chromium chloride.

28. The rebalance cell of claim 25, wherein the at least one metal salt of the at least one catholyte solution comprises iron chloride.

29. The rebalance cell of claim 25, wherein the membrane is a porous membrane.

30. The rebalance cell of claim 29, wherein the porous membrane comprises a material that is not susceptible to substantial degradation by aqueous HCl.

31. The rebalance cell of claim 29, wherein the porous membrane further comprises a layer facing the cathode compartment that is selectively permeable to H.

32. The rebalance cell of claim 31, wherein the selectively-permeable layer is perfluorinated.

33. The rebalance cell of claim 32, wherein the perfluorinated layer comprises at least one unit having the following structure:

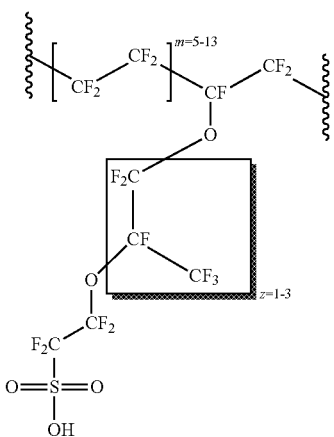

34. The rebalance cell of claim 25, wherein the electrode in the cathode compartment of the at least one rebalance cell is not susceptible to substantial degradation by aqueous $Cl_2$.

35. The rebalance cell of claim 25, wherein electrode comprises carbon or a mixed metal oxide disposed on a substrate.

36. The rebalance cell of claim 35, wherein the substrate is titanium.

37. The rebalance cell of claim 35, wherein the mixed metal oxide comprises iridium and ruthenium oxide.

38. The rebalance cell of claim 35, wherein at least some of the substrate remains exposed after deposition of the carbon or mixed metal oxide.

39. The rebalance cell of claim 25, wherein the at least one source of ultraviolet radiation emits wavelengths of light from about 370 nm to about 430 nm.

40. The rebalance cell of claim 39, wherein the at least one source of ultraviolet radiation emits wavelengths of light from about 390 nm to about 410 nm.

41. The rebalance cell of claim 25, wherein the at least one source of ultraviolet radiation is housed in the anode compartment.

42. The rebalance cell of claim 41, further comprising at least one gas inlet connected to the cathode compartment, and at least one outlet connected to the anode compartment.

43. The rebalance cell of claim 42, wherein the at least one gas inlet is placed in fluid communication with at least one gas source containing $H_2$.

44. The rebalance cell of claim 43, wherein the at least one $H_2$ gas source is a redox flow cell.

45. The rebalance cell of claim 43, wherein the at least one gas inlet effects the transfer of at least some $H_2$ to the cathode compartment.

46. The rebalance cell of claim 45, wherein the cathode compartment further comprises $Cl_2$ gas.

47. The rebalance cell of claim 46, wherein the electrode in the cathode compartment effects the formation of the $Cl_2$ gas present therein.

48. The rebalance cell of claim 46, wherein the at least one source of ultraviolet radiation is activated to effect the formation of HCl.

49. The rebalance cell of claim 25, further comprising at least one catholyte inlet in fluid communication with at least once catholyte source.

50. The rebalance cell of claim 49, further comprising at least one catholyte sensor and the controller controls the level of catholyte in response to the catholyte sensor.

51. The rebalance cell of claim 50, wherein the at least one catholyte sensor is electronically coupled to the at least one catholyte inlet, the at least one catholyte inlet being controlled by the controller.

52. The rebalance cell of claim 25, further comprising at least one gauge for monitoring temperature and pressure in the anode compartment.

53. The rebalance cell of claim 25, further comprising at least one sensor for monitoring the concentration of $H_2$ and $Cl_2$ gas in the anode compartment, the controller operating the at least one ultraviolet source in response to the concentration.

54. A rebalance system, comprising at least one rebalance cell of claim 25.

55. The rebalance system of claim 54, further comprising at least one anolyte reservoir containing at least one aqueous anolyte solution.

56. The rebalance system of claim 55, wherein the at least one anolyte solution comprises at least one acid and at least one metal salt.

57. The rebalance system of claim 56, wherein the at least one acid is HCl.

58. The rebalance system of claim 56, wherein the at least one metal salt of the at least one anolyte solution comprises chromium chloride.

59. The rebalance system of claim 54, further comprising at least one catholyte reservoir containing at least one aqueous catholyte solution.

60. The rebalance system of claim 59, wherein the at least one catholyte solution comprises at least one acid and at least one metal salt.

61. The rebalance system of claim 60, wherein the at least one acid is HCl.

62. The rebalance system of claim 60, wherein the at least one metal salt of the at least one catholyte solution comprises iron chloride.

63. The rebalance system of claim 54, wherein the rebalance cell is placed in fluid communication with at least one source of $H_2$ gas.

64. The rebalance system of claim 63, wherein the at least one source of $H_2$ gas is at least one redox cell.

65. The rebalance system of claim 64, wherein the fluid communication between the at least one redox cell and the rebalance cell is established through a catholyte reservoir.

66. The rebalance system of claim 64, wherein the fluid communication between the at least one redox cell and the rebalance cell is established through an anolyte reservoir.

* * * * *